US012791795B2

(12) United States Patent
Wang et al.

(10) Patent No.: US 12,791,795 B2
(45) Date of Patent: Nov. 10, 2026

(54) OPTICAL COUPLING STRUCTURE FOR SEMICONDUCTOR DEVICE

(71) Applicant: Taiwan Semiconductor Manufacturing Co., Ltd., Hsinchu (TW)

(72) Inventors: Chao-Jen Wang, Hsinchu (TW); Szu-Wei Lu, Hsinchu (TW); Tsung-Fu Tsai, Changhua (TW); Chen-Hua Yu, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 510 days.

(21) Appl. No.: 18/365,050

(22) Filed: Aug. 3, 2023

(65) Prior Publication Data

US 2025/0044517 A1 Feb. 6, 2025

(51) Int. Cl.
*G02B 6/30* (2006.01)
*G02B 6/32* (2006.01)

(52) U.S. Cl.
CPC *G02B 6/30* (2013.01); *G02B 6/32* (2013.01)

(58) Field of Classification Search
CPC ........... G02B 6/4204; G02B 6/32; G02B 6/30
See application file for complete search history.

(56) References Cited

U.S. PATENT DOCUMENTS

| | | | | |
|---|---|---|---|---|
| 9,933,574 | B1 * | 4/2018 | Zhang | G02B 6/4239 |
| 2019/0170945 | A1 * | 6/2019 | Fortusini | G02B 6/13 |
| 2020/0241220 | A1 | 7/2020 | Evans | |
| 2022/0155526 | A1 * | 5/2022 | Dong | G02B 6/421 |
| 2023/0083222 | A1 | 3/2023 | Darmawikarta et al. | |
| 2025/0044532 | A1 * | 2/2025 | Shao | G02B 6/4206 |

FOREIGN PATENT DOCUMENTS

WO 2019079271 A1 4/2019

* cited by examiner

*Primary Examiner* — Michael P Mooney
(74) *Attorney, Agent, or Firm* — Slater Matsil, LLP

(57) ABSTRACT

A package includes an optical engine attached to a package substrate, wherein the optical engine includes a first waveguide; and a waveguide structure attached to the package substrate adjacent the optical engine, wherein the waveguide structure includes a second waveguide within a transparent block, wherein a first end of the second waveguide is optically coupled to the first waveguide, wherein the waveguide structure is configured to be connected to an optical fiber component such that a second end of the second waveguide is optically coupled to an optical fiber of the optical fiber component.

8 Claims, 21 Drawing Sheets

100

100

OPTICAL COUPLING STRUCTURE FOR SEMICONDUCTOR DEVICE

BACKGROUND

Electrical signaling and processing are one technique for signal transmission and processing. Optical signaling and processing have been used in increasingly more applications in recent years, particularly due to the use of optical fiber-related applications for signal transmission.

Optical signaling and processing are typically combined with electrical signaling and processing to provide full-fledged applications. For example, optical fibers may be used for long-range signal transmission, and electrical signals may be used for short-range signal transmission as well as processing and controlling. Accordingly, devices integrating optical components and electrical components are formed for the conversion between optical signals and electrical signals, as well as the processing of optical signals and electrical signals. Packages thus may include both optical (photonic) dies including optical devices and electronic dies including electronic devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
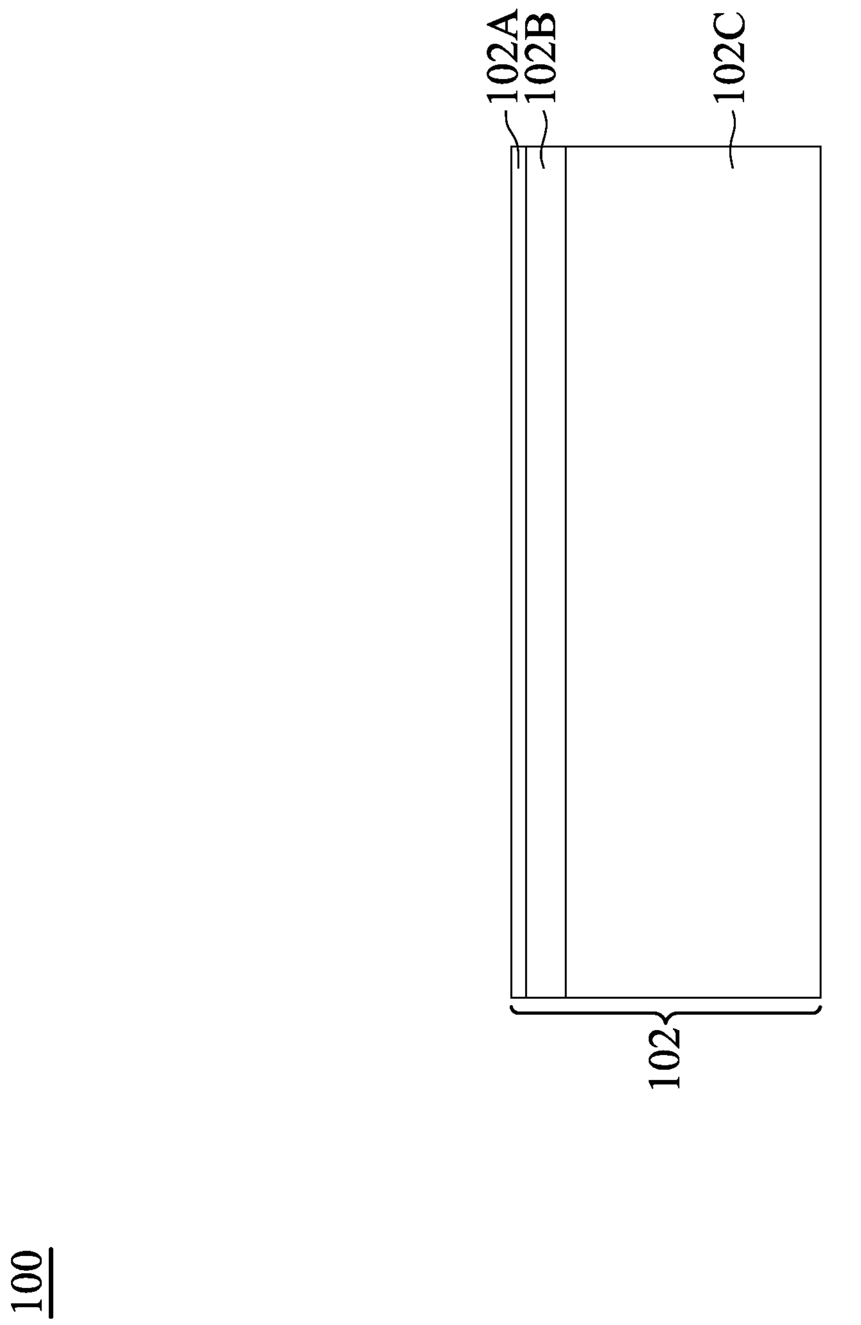
FIGS. 1-9 illustrate the formation of an optical package, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A photonic system including a waveguide structure for integrating optical fibers with an optical engine and the method of forming the same are provided. The waveguide structure includes waveguides formed by laser writing within a transparent material. The laser-written waveguides transmit optical signals and/or optical power between optical fibers and a photonic component of a photonic system, such as an optical engine or the like. The use of laser writing to form a waveguide structure can form a small structure for efficient optical coupling that allows for flexible design and smaller pitch sizes of optical features. Embodiments discussed herein are to provide examples to enable making or using the subject matter of this disclosure, and a person having ordinary skill in the art will readily understand modifications that can be made while remaining within contemplated scopes of different embodiments. Throughout the various views and illustrative embodiments, like reference numbers are used to designate like elements. Although method embodiments may be discussed as being performed in a particular order, other method embodiments may be performed in any logical order.

FIGS. 1 through 9 show cross-sectional views of intermediate steps of forming an optical engine 100 (see FIG. 9), in accordance with some embodiments. In some embodiments, the optical engine 100 may act as an input/output (I/O) interface between optical signals and electrical signals. One or more optical engines may be used in a photonic package, photonic structure, photonic system, or the like. For example, one or more optical engines 100 may be used in a photonic system such as the photonic package 200 described below for FIG. 10, a photonic system such as the photonic system 500 described below for FIG. 25, other embodiments described herein, or the like. In some embodiments, multiple optical engines 100 are formed on the same substrate (e.g., substrate 102 of FIG. 1) and then subsequently singulated into individual optical engines 100.

Turning first to FIG. 1, a buried oxide ("BOX") substrate 102 is provided, in accordance with some embodiments. The BOX substrate 102 includes an oxide layer 102B formed over a substrate 102C, and a silicon layer 102A formed over the oxide layer 102B. The substrate 102C may be, for example, a material such as a glass, ceramic, dielectric, a semiconductor, the like, or a combination thereof. In some embodiments, the substrate 102C may be a semiconductor substrate, such as a bulk semiconductor or the like, which may be doped (e.g., with a p-type or an n-type dopant) or undoped. The substrate 102C may be a wafer, such as a silicon wafer (e.g., a 12-inch silicon wafer). Other substrates, such as a multi-layered or gradient substrate may also be used. In some embodiments, the semiconductor material of the substrate 102C may include silicon; germanium; a compound semiconductor including silicon carbide, gallium arsenic, gallium phosphide, indium phosphide, indium arsenide, and/or indium antimonide; an alloy semiconductor including silicon germanium, GaAsP, AlInAs, AlGaAs, GaInAs, GaInP, and/or GaInAsP; or combinations thereof. The oxide layer 102B may be, for example, a silicon oxide or the like. In some embodiments, the oxide layer 102B may have a thickness between about 0.5 μm and about 4 μm. The silicon layer 102A may have a thickness between about 0.1 μm and about 1.5 μm, in some embodiments. Other thicknesses or materials are possible. The BOX substrate 102 may be referred to as having a front side or front surface (e.g., the side facing upwards in FIG. 1), and a back side or back surface (e.g., the side facing downwards in FIG. 1).

Figure 2:
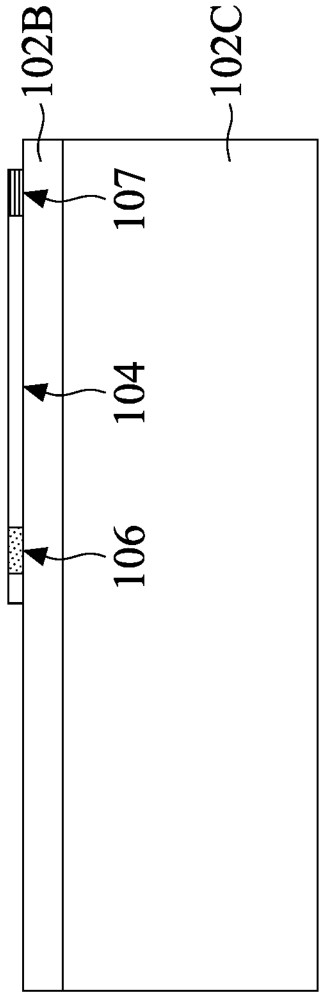

In FIG. 2, the silicon layer 102A is patterned to form silicon regions for waveguides 104, photonic components 106, and/or edge couplers 107, in accordance with some embodiments. The silicon layer 102A may be patterned using suitable photolithography and etching techniques. For example, a hardmask layer (e.g., a nitride layer or other dielectric material, not shown in FIG. 2) may be formed over the silicon layer 102A and patterned, in some embodiments. The pattern of the hardmask layer may then be transferred to the silicon layer 102A using one or more etching techniques, such as dry etching and/or wet etching techniques. For example, the silicon layer 102A may be etched to form recesses defining the waveguides 104, with sidewalls of the remaining unrecessed portions defining sidewalls of the waveguides 104. In some embodiments, more than one photolithography and etching sequence may be used in order to pattern the silicon layer 102A. One waveguide 104 or multiple waveguides 104 may be patterned from the silicon layer 102A. If multiple waveguides 104 are formed, the multiple waveguides 104 may be individual separate waveguides 104 or connected as a single continuous structure. In some embodiments, one or more of the waveguides 104 form a continuous loop. Other configurations or arrangements of waveguides 104, the photonic components 106, or the edge couplers 107 are possible. In some cases, the waveguides 104, the photonic components 106, and the edge couplers 107 may be collectively referred to as "the photonic layer."

The photonic components 106 may be integrated with the waveguides 104, and may be formed with the silicon waveguides 104 in some embodiments. The photonic components 106 may be physically and/or optically coupled to the waveguides 104 to interact with optical signals within the waveguides 104. The photonic components 106 may include, for example, photodetectors, modulators, or the like. For example, a photodetector may be optically coupled to the waveguides 104 to detect optical signals within the waveguides 104 and generate electrical signals corresponding to the optical signals. A modulator may be optically coupled to the waveguides 104 to receive electrical signals and generate corresponding optical signals within the waveguides 104 by modulating optical power within the waveguides 104. In this manner, the photonic components 106 can facilitate the input/output (I/O) of optical signals to and from the waveguides 104. In other embodiments, the photonic components may include other active or passive components, such as laser diodes, LEDs, optical signal splitters, phase shifters, resonators, amplifiers, optical cavities, evanescent couplers, grating couplers, or other types of structures or devices. Optical power may be provided to the waveguides 104 by, for example, an optical fiber (not shown in FIGS. 1-9) coupled to an external light source (e.g., by an edge coupler 107 or a grating coupler), or optical power may be provided by a photonic component within the optical engine 100 such as a laser diode or the like (not shown in FIGS. 1-9). In some embodiments, optical power and/or optical signals may be transmitted to the waveguides 104 from an adjacent optical engine, photonic package, photonic structure, photonic system, photonic component, or the like.

In some embodiments, a photonic component 106 such as a photodetector may be formed by, for example, partially etching regions of the waveguides 104 and growing an epitaxial material on the remaining silicon of the etched regions. The waveguides 104 may be etched using acceptable photolithography and etching techniques. The epitaxial material may comprise, for example, a semiconductor material such as germanium (Ge) or the like, which may be doped or undoped. In some embodiments, an implantation process may be performed to introduce dopants (e.g., p-type dopants, n-type dopants, or a combination) within the silicon of the etched regions or within the epitaxial material. In some embodiments, a photonic component 106 such as a modulator may be formed by, for example, partially etching regions of the waveguides 104 and then implanting appropriate dopants (e.g., p-type dopants, n-type dopants, or a combination) within the remaining silicon of the etched regions. The waveguides 104 may be etched using acceptable photolithography and etching techniques. In some embodiments, the etched regions used for a photodetector and the etched regions used for a modulator may be formed using one or more of the same photolithography or etching steps. In some embodiments, the etched regions used for a photodetector and the etched regions used for a modulator may be implanted using one or more of the same implantation steps. Other photonic components 106 and other manufacturing steps are possible.

In some embodiments, one or more edge couplers 107 may be integrated with the waveguides 104, and may be formed with the waveguides 104. The edge couplers 107 may be continuous with the waveguides 104 and may be formed in the same processing steps as the waveguides 104 or other photonic components 106. An edge coupler 107 allows optical signals and/or optical power to be transferred between a waveguide 104 and an optical or photonic component that is near an adjacent sidewall of the optical engine 100. For example, an edge coupler 107 may be optically coupled to a component such as another waveguide (e.g., a waveguide 304 described below), another optical engine, another photonic package, another photonic system, an optical fiber, an external laser diode, or the like. An optical engine 100 may include a single edge coupler 107 or multiple edge couplers 107. The couplers 107 may be formed using acceptable photolithography and etching techniques, in some embodiments. The couplers 107 may be formed using the same photolithography or etching steps as the waveguides 104 and/or the photonic components 106, in some embodiments. In other embodiments, the couplers 107 are formed after the waveguides 104 and/or the photonic components 106 are formed.

Figure 3:
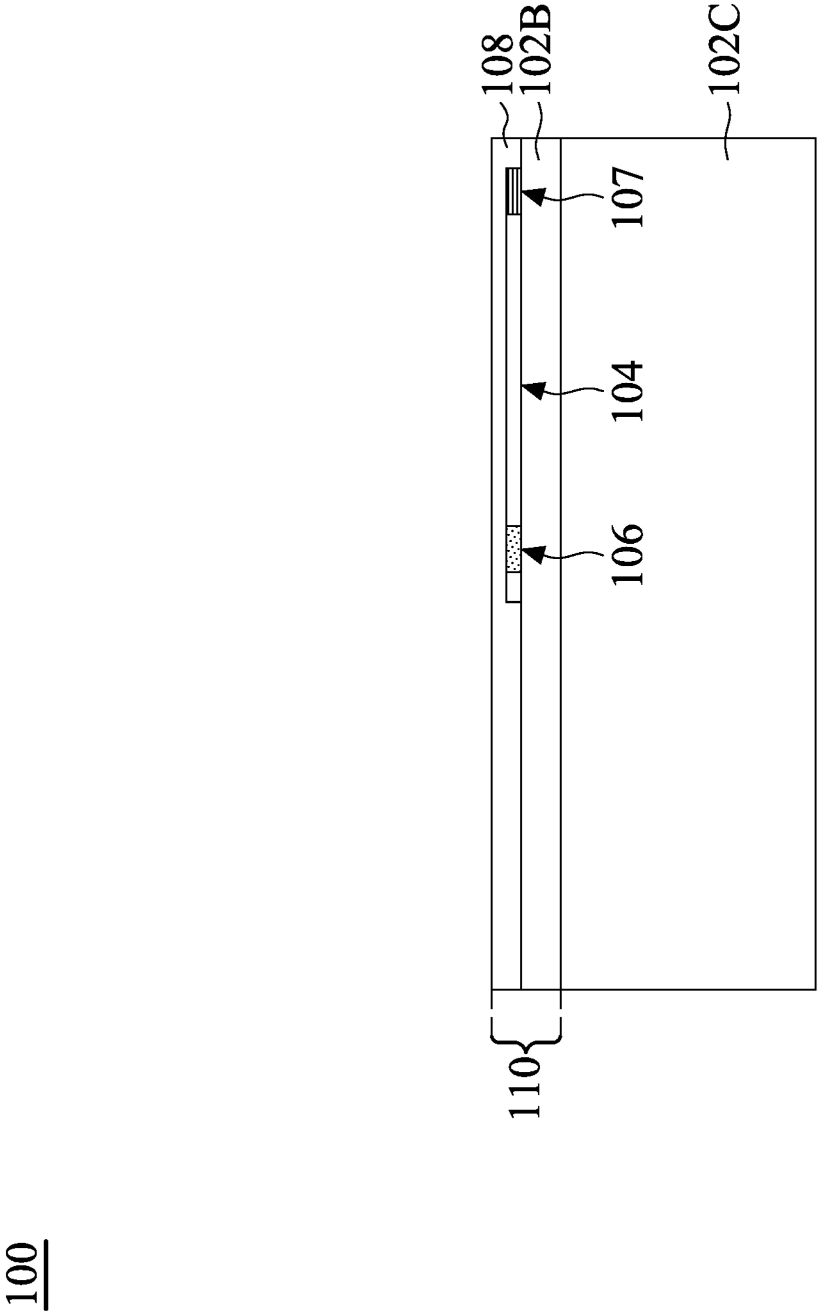

In FIG. 3, a dielectric layer 108 is formed on the front side of the BOX substrate 102 to form a photonic routing structure 110, in accordance with some embodiments. The dielectric layer 108 is formed over the waveguides 104, the photonic components 106, the edge couplers 107, and the oxide layer 102B. The dielectric layer 108 may be formed of one or more layers of silicon oxide, silicon nitride, a combination thereof, or the like, and may be formed by CVD, PVD, atomic layer deposition (ALD), a spin-on-dielectric process, the like, or a combination thereof. In some embodiments, the dielectric layer 108 may be formed by a high density plasma chemical vapor deposition (HDP-CVD), a flowable CVD (FCVD) (e.g., a CVD-based material deposition in a remote plasma system and post curing to make it convert to another material, such as an oxide), the like, or a combination thereof. Other dielectric materials formed by any acceptable process may be used. In some embodiments, the dielectric layer 108 is then planarized using a planarization process such as a CMP process, a grinding process, or the like. The dielectric layer 108 may be formed having a thickness over the oxide layer 102B between about 50 nm and about 500 nm, or may be formed having a thickness over the waveguides 104 between about 10 nm and about 200 nm, in some embodiments. Other thicknesses are possible.

Due to the difference in refractive indices of the materials of the waveguides 104 and dielectric layer 108, the waveguides 104 have high internal reflection such that light is substantially confined within the waveguides 104, depending on the wavelength of the light and the refractive indices of the respective materials. In an embodiment, the refractive index of the material of the waveguides 104 is higher than the refractive index of the material of the dielectric layer 108. For example, the waveguides 104 may comprise silicon, and the dielectric layer 108 may comprise silicon oxide and/or silicon nitride. In other embodiments, the waveguides 104 may be formed of silicon nitride or the like. Other materials are possible.

Figure 4:
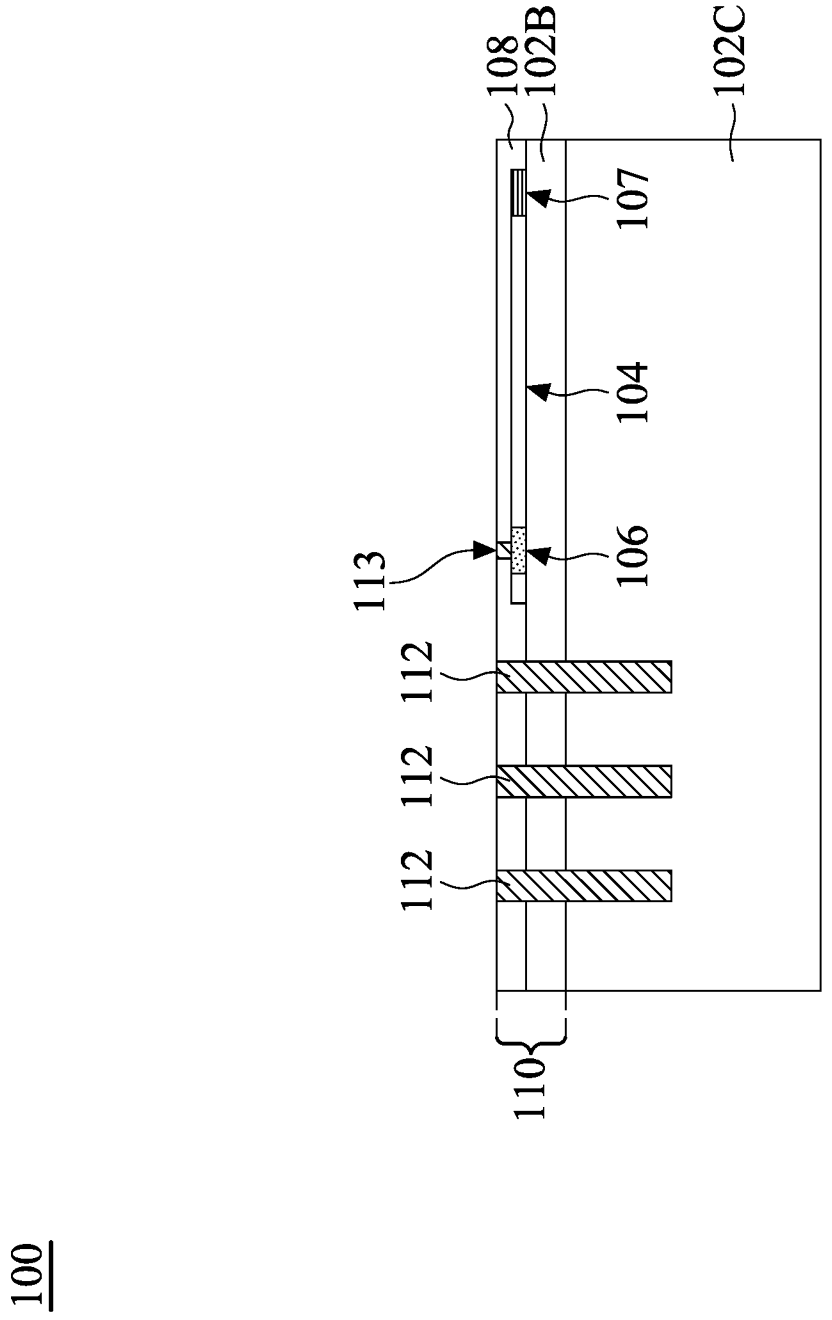

In FIG. 4, vias 112 and contacts 113 are formed, in accordance with some embodiments. The vias 112 extend into the substrate 102C and allow electrical connections to be formed at the back side of the optical engine 100. The contacts 113 allow electrical signals and/or electrical power to be transmitted to or from appropriate photonic components 106. In this manner, the photonic components 106 may convert electrical signals (e.g., from an electronic die 122, see FIG. 7) into optical signals that are transmitted by the waveguides 104, or the photonic components 106 may convert optical signals within the waveguides 104 into electrical signals (e.g., that may be received by an electronic die 122). The vias 112 and/or the contacts 113 may be formed, for example, by forming openings (not separately illustrated) in the dielectric layer 108. Openings where vias 112 are subsequently formed may extend through the dielectric layer 108, through the oxide layer 102B, and partially into the substrate 102C, in accordance with some embodiments. The openings may be formed by acceptable photolithography and etching techniques, such as by forming and patterning a photoresist and then performing an etching process using the patterned photoresist as an etching mask. The etching process may include, for example, a dry etching process and/or a wet etching process. The openings for the vias 112 and the openings for the contacts 113 may be formed separately or may be formed using one or more simultaneous steps.

Conductive material is then deposited in the openings, thereby forming vias 112 and contacts 113, in accordance with some embodiments. In some embodiments, a liner (not shown), such as a diffusion barrier layer, an adhesion layer, or the like, may first be deposited in the openings. The liner may comprise, for example, tantalum nitride, tantalum (Ta), titanium nitride, titanium (Ti), cobalt tungsten, or the like, and may be formed using a suitable deposition process such as CVD, PVD, ALD or the like. In some embodiments, the vias 112 and/or the contacts 113 may be formed by depositing a seed layer (not shown) in the openings. The seed layer may be deposited on the liner, if present. The seed layer may comprise copper, a copper alloy, or the like, in some embodiments. The conductive material may then be formed in the openings using, for example, ECP or electro-less plating. The conductive material may include, for example, a metal or a metal alloy such as copper, silver, gold, tungsten, cobalt, ruthenium, aluminum, or alloys thereof. A planarization process (e.g., a CMP process or a grinding process) may be performed to remove excess conductive material along the top surface of the dielectric layer 108, such that top surfaces of the vias 112, contacts 113, and/or the dielectric layer 108 are level. This is an example, and the vias 112 and/or the contacts 113 may be formed using any suitable techniques, such as by a damascene process (e.g., single damascene or dual damascene), the like, or another process. The contacts 113 may be formed before or after formation of the vias 112, and the formation of the contacts 113 and the formation of the vias 112 may share some steps such as deposition of the conductive material and/or planarization. The vias 112 and the contacts 113 may be formed using other techniques or materials in other embodiments. The vias 112 and the contacts 113 may be formed using similar techniques or materials or different techniques or materials. More or fewer vias 112 or contacts 113 may be formed than shown in the figures, and in some other embodiments no vias 112 are formed.

Figure 5:
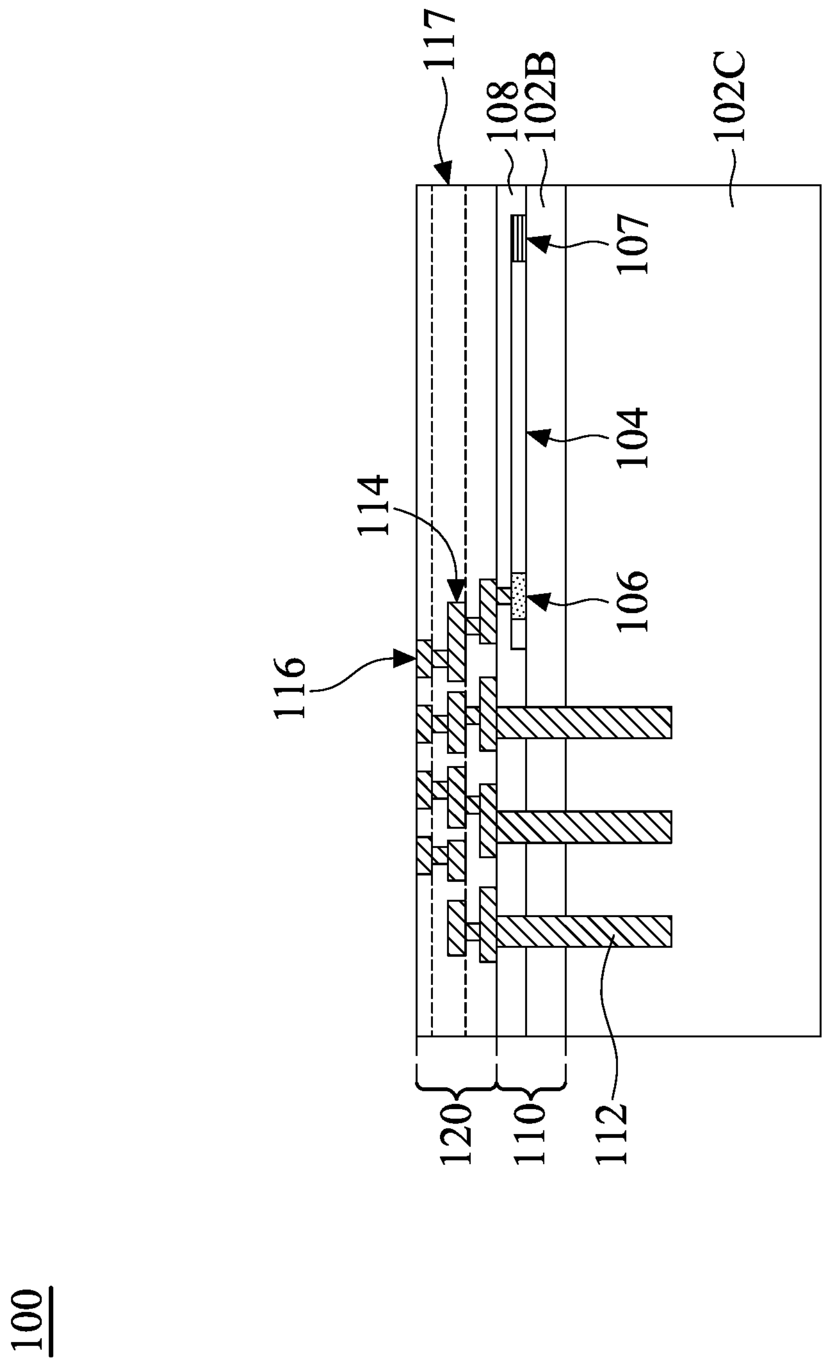

In FIG. 5, a redistribution structure 120 is formed over the dielectric layer 108, in accordance with some embodiments. The redistribution structure 120 includes one or more dielectric layers 117 and conductive features 114 formed in the dielectric layer(s) 117 that provide interconnections and electrical routing. For example, the redistribution structure 120 may connect the vias 112, the contacts 113, and/or overlying devices such as electronic dies 122 (see FIG. 7). In some other embodiments, the redistribution structure 120 may electrically connect to the photonic component 106 instead of a contact 113, or the contact 113 may be considered part of the redistribution structure 120. The dielectric layers 117 may be, for example, insulating or passivating layers, and may comprise one or more materials similar to those described above for the dielectric layer 108, such as a silicon oxide or a silicon nitride, or may comprise a different material. The dielectric layers 117 and the dielectric layer 108 may be transparent or nearly transparent to light within the same range of wavelengths, in some embodiments. The dielectric layers 117 may be formed using a technique similar to those described above for the dielectric layer 108 or using a different technique. The conductive features 114 may include conductive lines and vias, and may be formed by a damascene process (e.g., single damascene, dual damascene), the like, or another process. As shown in FIG. 5, conductive pads 116 may be formed in the topmost layer of the dielectric layers 117. A planarization process (e.g., a CMP process or the like) may be performed after forming the conductive pads 116 such that surfaces of the conductive pads 116 and the topmost dielectric layer 117 are substantially coplanar (e.g., level). The redistribution structure 120 may include more or fewer dielectric layers 117, conductive features 114, or conductive pads 116 than shown in FIG. 6, and may have a different arrangement or configuration. The redistribution structure 120 may be formed having a thickness between about 4 μm and about 6 μm, in some embodiments. Other thicknesses are possible.

Figure 6:
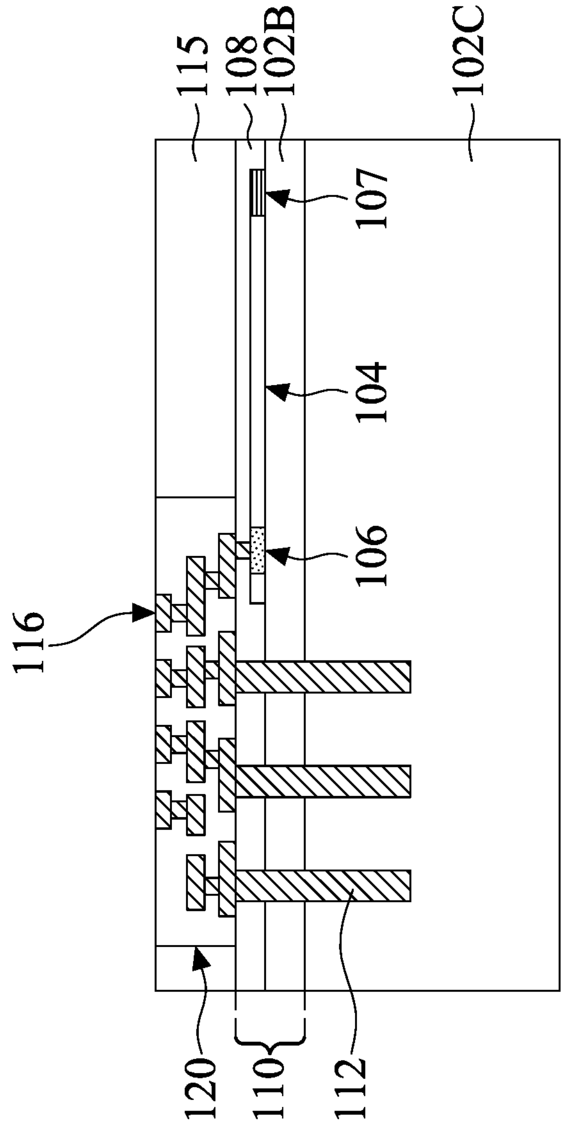

In FIG. 6, portions of the redistribution structure 120 are removed and replaced by a dielectric layer 115, in accordance with some embodiments. The portions of the redistribution structure 120 may be removed, for example, using acceptable photolithography and etching techniques, such as by forming and patterning a photoresist and then performing an etching process to remove the dielectric layers 117 using the patterned photoresist as an etching mask. The etching process may include, for example, a dry etching process and/or a wet etching process. Removing the portions of the redistribution structure 120 may expose the dielectric layer 108, in some embodiments. In other embodiments, the dielectric layer 108 may remain covered by one or more dielectric layers 117 after removing the portions of the redistribution structure 120.

After removing the portions of the redistribution structure, the dielectric layer 115 may then be deposited to replace the removed portions of the redistribution structure 120. The dielectric layer 115 may comprise one or more materials similar to those described above for the dielectric layer 108, such as a silicon oxide or a silicon nitride, or may comprise a different material. The dielectric layer 115 may be formed using a technique similar to those described above for the dielectric layer 108 or using a different technique. In some embodiments, a planarization process (e.g., a CMP or grinding process) is used to remove excess material of the dielectric layer 115. The planarization process may also expose the conductive pads 116. After performing the planarization process, the dielectric layer 115, the topmost dielectric layer 117, and/or the conductive pads 116 may have substantially level surfaces. In some cases, replacing a portion of the redistribution structure 120 with the dielectric layer 115 can improve the optical confinement within the waveguides 104 beneath the dielectric layer 115. In other embodiments, the redistribution structure 120 is not etched and the dielectric layer 115 is not formed. In other embodiments, etching the redistribution structure 120 separates the redistribution structure 120 into multiple separated regions.

Figure 7:
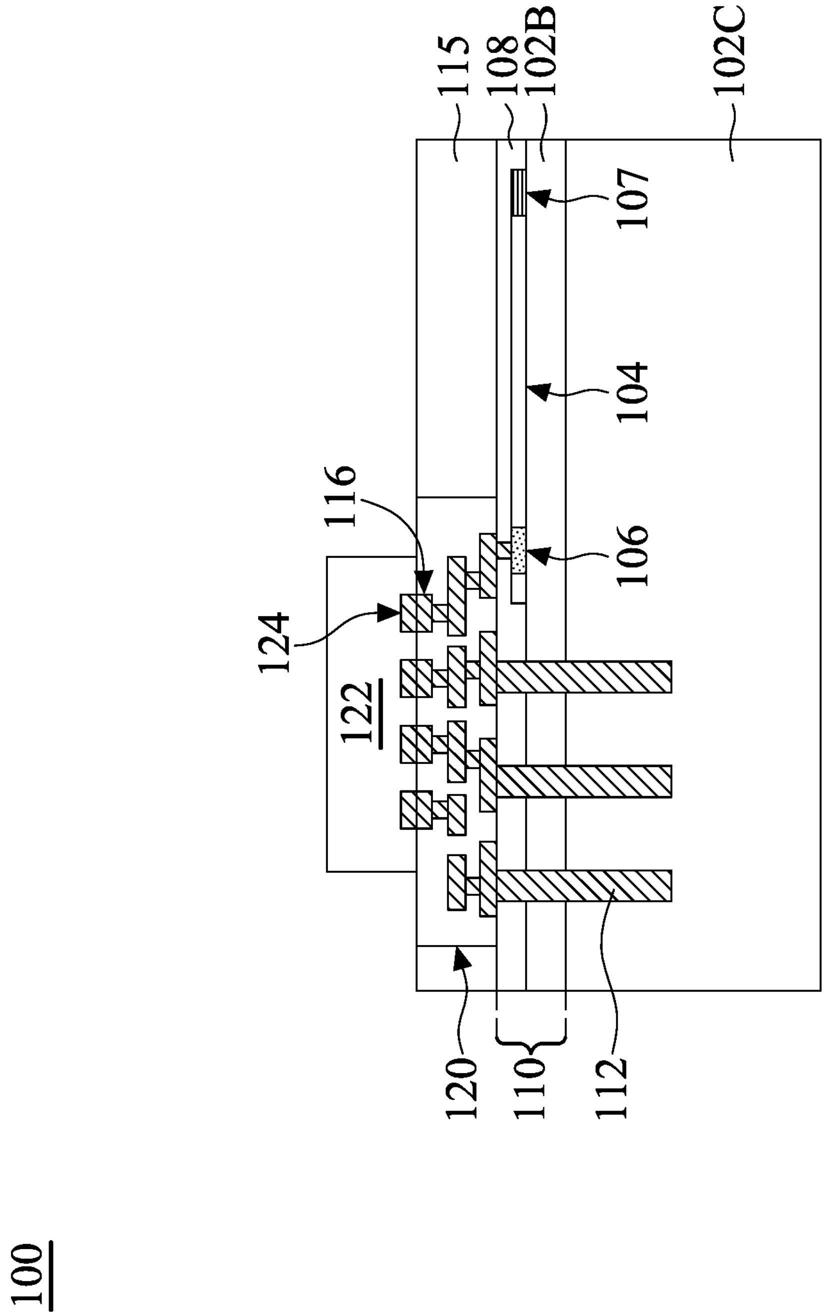

In FIG. 7, one or more electronic dies 122 are bonded to the redistribution structure 120, in accordance with some embodiments. The electronic dies 122 may be, for example, semiconductor devices, dies, or chips that communicate with the photonic components 106 using electrical signals. One electronic die 122 is shown in FIG. 7, but an optical engine 100 may include two or more electronic dies 122 in other embodiments. In some cases, multiple electronic dies 122 may be incorporated into a single optical engine 100 in order to reduce processing cost. The electronic die 122 may include die connectors 124, which may be, for example, conductive pads, conductive pillars, or the like.

The electronic die 122 may include integrated circuits for interfacing with the photonic components 106, such as circuits for controlling the operation of the photonic components 106. For example, the electronic die 122 may include controllers, drivers, transimpedance amplifiers, the like, or combinations thereof. The electronic die 122 may also include a CPU. In some embodiments, the electronic die 122 includes circuits for processing electrical signals received from photonic components 106, such as for processing electrical signals received from a photonic component 106 comprising a photodetector. The electronic die 122 may control high-frequency signaling of the photonic components 106 according to electrical signals (digital or analog) received from another device or die, in some embodiments. In some embodiments, the electronic die 122 may be an electronic integrated circuit (EIC) or the like that provides Serializer/Deserializer (SerDes) functionality. In this manner, the electronic die 122 may act as part of an I/O interface between optical signals and electrical signals within an optical engine 100, and the optical engine 100 described herein could be considered a system-on-chip (SoC) device or a system-on-integrated-circuit (SoIC) device.

In some embodiments, the electronic die 122 is bonded to the redistribution structure 120 by dielectric-to-dielectric bonding and/or metal-to-metal bonding (e.g., direct bonding, fusion bonding, oxide-to-oxide bonding, hybrid bonding, or the like). In such embodiments, covalent bonds may be formed between bonding layers, such as the topmost dielectric layer 117 and surface dielectric layers (not separately indicated) of the electronic die 122. The bonding layers may be oxide layers or layers of other dielectric materials. During the bonding, metal-to-metal bonding may also occur between the die connectors 124 of the electronic die 122 and the conductive pads 116 of the redistribution structure 120. In other embodiments, the electronic die 122 may be bonded to the redistribution structure 120 using solder bonding, solder bumps, or the like.

Figure 8:
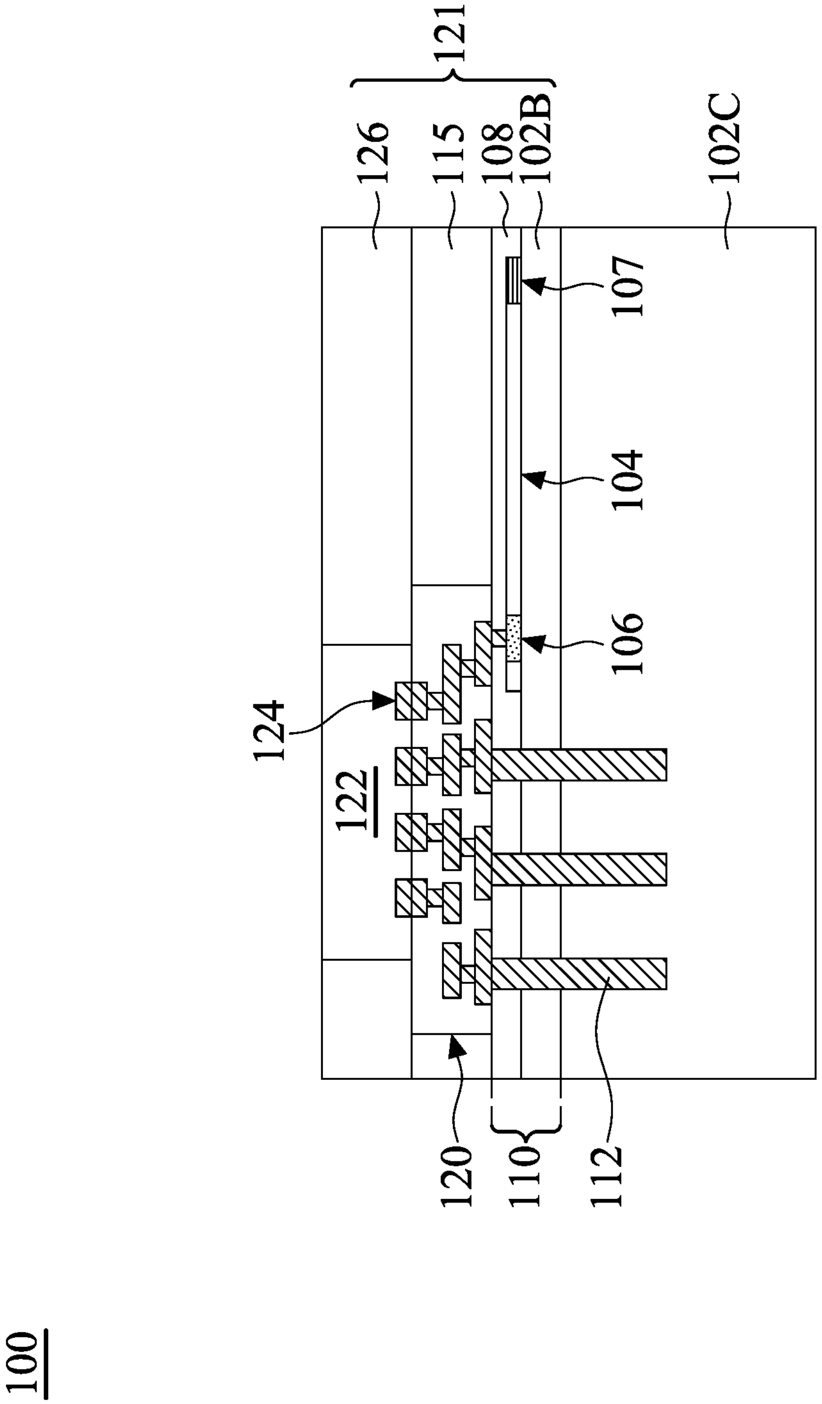

In FIG. 8, a dielectric material 126 is formed over the electronic die 122 and the redistribution structure 120, in accordance with some embodiments. The dielectric material 126 may be formed of silicon oxide, a flowable oxide, a glass, silicon nitride, a polymer, the like, or a combination thereof. The dielectric material 126 may be formed by CVD, PVD, ALD, a spin-on process, the like, or a combination thereof. In some embodiments, the dielectric material 126 may be formed by HDP-CVD, FCVD, the like, or a combination thereof. The dielectric material 126 may be a gap-filling material in some embodiments, which may include one or more of the example materials above. Other dielectric materials formed by any acceptable process may be used. The dielectric material 126 may be planarized using a planarization process such as a CMP process, a grinding process, or the like. In some embodiments, the planarization process may expose the electronic die 122 such that a surface of the electronic die 122 and a surface of the dielectric material 126 are substantially coplanar. The oxide layer 102B, the dielectric layer 108, the dielectric layer 115 and the dielectric material 126 may be collectively referred to herein as the dielectric layers 121.

Figure 9:
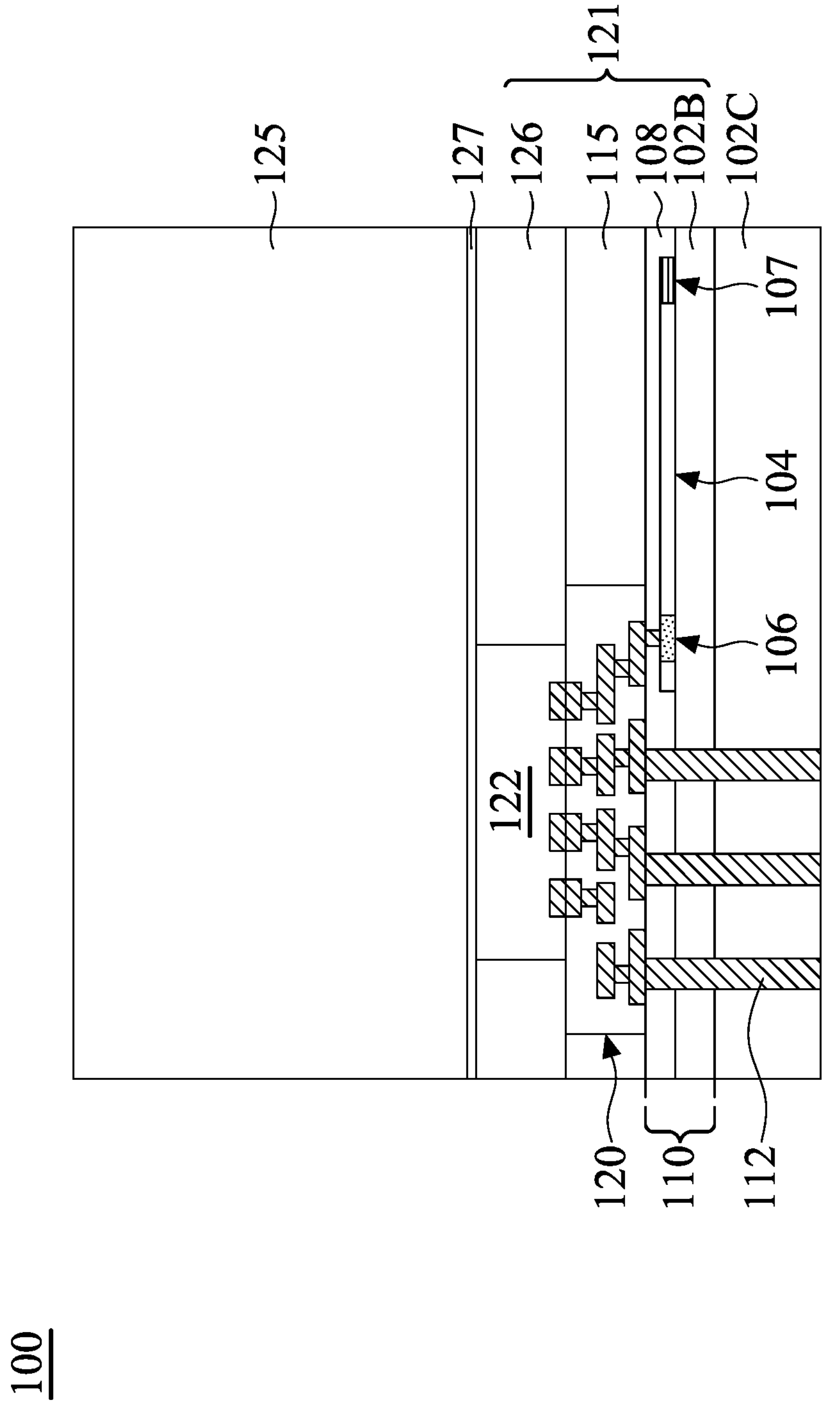

In FIG. 9, an optional support 125 is attached to the structure, in accordance with some embodiments. The support 125 is attached to the structure in order to provide structural or mechanical stability. The use of a support 125 can reduce warping or bending, which can improve the performance of the optical structures such as the waveguides 104 or photonic components 106. The support 125 may comprise one or more materials such as silicon (e.g., a silicon wafer, bulk silicon, or the like), silicon oxide, silicon oxynitride, silicon carbonitride, a metal, an organic core material, the like, or another type of material. The support 125 may be attached to the structure (e.g., to the dielectric material 126 and/or the electronic dies 122) using an adhesive layer 127 or the like. In other embodiments, the support 125 may be attached using direct bonding (e.g., dielectric-to-dielectric bonding, fusion bonding, or the like) or another suitable technique. The support 125 may also have lateral dimensions (e.g., length, width, and/or area) that are greater than, about the same as, or smaller than those of the underlying structure. In other embodiments, the support 125 is attached at a later process step during the manufacturing of the optical engine 100 than shown. In some embodiments, the support 125 may be subsequently thinned using a CMP process, a grinding process, or the like. Further in FIG. 9, the back side of the substrate 102C may be thinned to expose the vias 112, in accordance with some embodiments. The substrate 102C may be thinned using a CMP process, a grinding process, an etching process, the like, or a combination thereof.

Figure 10:
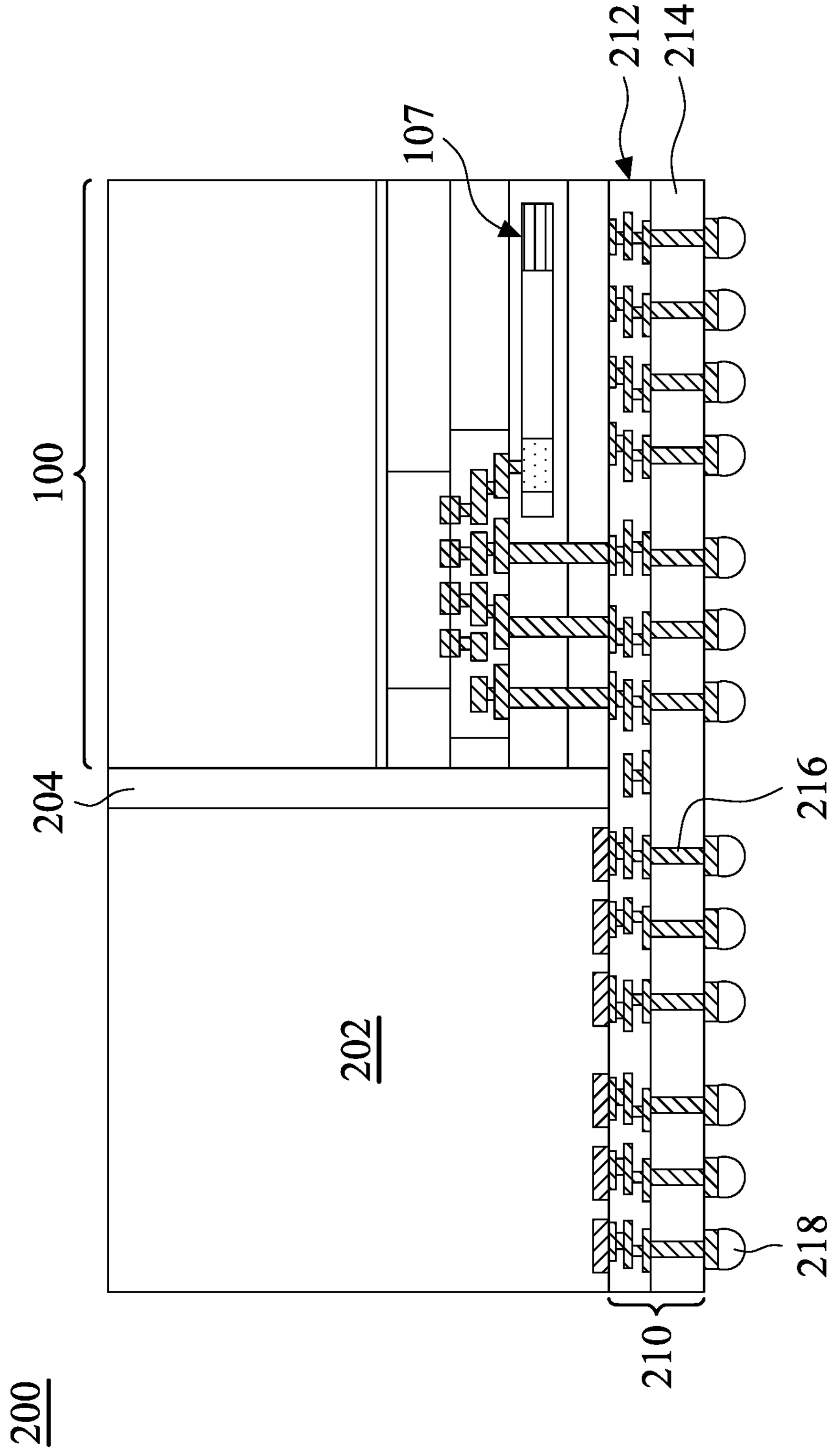
FIG. 10 illustrates a photonic package, in accordance with some embodiments.

In FIG. 10, the optical engine 100 is optionally attached to an interconnect substrate 210 to form a photonic package 200, in accordance with some embodiments. The interconnect substrate 210 may comprise an interconnect structure 212 on a substrate 214, in some embodiments. The interconnect substrate 210 may also have through vias 216 extending through the substrate 214 that are electrically connected to the interconnect structure 212. The interconnect substrate 210 shown in FIG. 10 is an example, and other interconnect substrates or configurations thereof are possible. In some embodiments, the interconnect substrate 210 may be considered an interposer or the like. The interconnect substrate 210 may include passive or active devices, in some embodiments. In other embodiments, more than one optical engine 100 may be attached to an interconnect substrate 210. In other embodiments, one or more semiconductor dies 202 may also be attached to the interconnect substrate 210, described in greater detail below. The photonic package 200 shown in FIG. 10 is an example, and other photonic packages or configurations thereof are possible.

The substrate 214 of the interconnect substrate 210 may comprise, for example, a glass substrate, a ceramic substrate, a dielectric substrate, an organic substrate (e.g., an organic core), a semiconductor substrate (e.g., a semiconductor wafer), the like, or a combination thereof. The through vias 216 extend through the substrate 214 and may be formed using materials or techniques similar to those of the vias 112 or using different materials or techniques.

The interconnect structure 212 of the interconnect substrate 210 includes dielectric layers and conductive features formed in the dielectric layers, in some embodiments. The interconnect structure 212 provides interconnections and electrical routing, and may be electrically connected to the through vias 216 and/or the vias 112. The dielectric layers may be, for example, insulating or passivating layers, and may include a material similar to those described above for the dielectric layer 108 or the dielectric layers 117. For example, the dielectric layers of the interconnect structure 212 may include materials such as a silicon oxide, silicon nitride, or the like. The conductive features of the interconnect structure 212 may include conductive lines and vias, and may be formed using materials or techniques similar to those of the conductive features 114 or using different materials or techniques. For example, the conductive features of the interconnect structure 212 may be formed using a damascene process, e.g., dual damascene, single damascene, or the like.

In some embodiments, the optical engine 100 is bonded to the interconnect substrate 210 by dielectric-to-dielectric bonding and/or metal-to-metal bonding (e.g., direct bonding, fusion bonding, oxide-to-oxide bonding, hybrid bonding, or the like). For example, the back side of the optical engine 100 (e.g., the back side of the substrate 102C) may be bonded to the interconnect structure 212. In some embodiments, the vias 112 of the optical engine 100 are bonded to conductive features of the interconnect structure 212 to physically and electrically connect the optical engine 100 to the interconnect substrate 210. In some embodiments, a bonding layer may be formed on the back side of the substrate 102C prior to bonding with the interconnect substrate 210. In other embodiments, the optical engine 100 may be bonded to the interconnect substrate 210 using solder bonding, solder bumps, or the like.

In some embodiments, a photonic package 200 may include one or more semiconductor dies 202 connected to the interconnect substrate 210 in addition to the optical engine 100. For example, FIG. 10 illustrates a photonic package 200 including a single semiconductor die 202, in accordance with some embodiments. The one or more semiconductor dies 202 may include, for example, a chip, die, system-on-chip (SoC) device, system-on-integrated-circuit (SoIC) device, package, the like, or a combination thereof. The semiconductor die(s) 202 may include one or more processing devices, such as a central processing unit (CPU), a graphics processing unit (GPU), an application-specific integrated circuit (ASIC), a high performance computing (HPC) die, the like, or a combination thereof. The semiconductor die(s) 202 may include one or more memory devices, which may be a volatile memory such as dynamic random-access memory (DRAM), static random-access memory (SRAM), high-bandwidth memory (HBM), another type of memory, or the like. The one or more semiconductor dies 202 may be attached to the interconnect structure 212 of the interconnect substrate 210 using direct bonding, solder bumps, or the like. In this manner, the semiconductor die(s) 202 are electrically connected to the interconnect substrate 210, and may be electrically coupled to one or more optical engines 100 by the interconnect substrate 210. In some embodiments, an encapsulant 204 may be deposited over and/or between the optical engine(s) 100 and the semiconductor die(s) 202. The encapsulant 204 may be, for example, a molding material, an epoxy, a polymer, or the like.

In some embodiments, conductive connectors 218 are formed on the interconnect substrate 210, in accordance with some embodiments. The conductive connectors 218 are electrically connected to the interconnect substrate 210 by the through vias 216. In some embodiments, the conductive connectors 218 include conductive pads formed on the through vias 216 and the substrate 214. The conductive pads may be, for example, aluminum pads or aluminum-copper pads, although other metallic pads may be used. The conductive pads may include underbump metallizations (UBMs), in some embodiments.

The conductive connectors 218 may include solder balls, solder bumps, or the like formed on the conductive pads, in some embodiments. For example, the conductive connectors 218 may include ball grid array (BGA) connectors, solder balls, metal pillars, controlled collapse chip connection (C4) bumps, micro bumps, electroless nickel-electroless palladium-immersion gold technique (ENEPIG) formed bumps, or the like. The conductive connectors 218 may include a conductive material such as solder, copper, aluminum, gold, nickel, silver, palladium, tin, the like, or a combination thereof. In some embodiments, the conductive connectors 218 are formed by initially forming a layer of solder through such commonly used methods such as evaporation, electroplating, printing, solder transfer, ball placement, or the like. Once a layer of solder has been formed on the structure, a reflow may be performed in order to shape the material into the desired bump shapes. In another embodiment, the conductive connectors 218 include metal pillars (such as a copper pillar) formed by a sputtering, printing, electro plating, electroless plating, CVD, or the like. The metal pillars may be solder free and have substantially vertical sidewalls. In some embodiments, a metal cap layer (not shown) is formed on the top of the conductive connectors 218. The metal cap layer may include nickel, tin, tin-lead, gold, silver, palladium, indium, nickel-palladium-gold, nickel-gold, the like, or a combination thereof and may be formed by a plating process.

Figure 12:
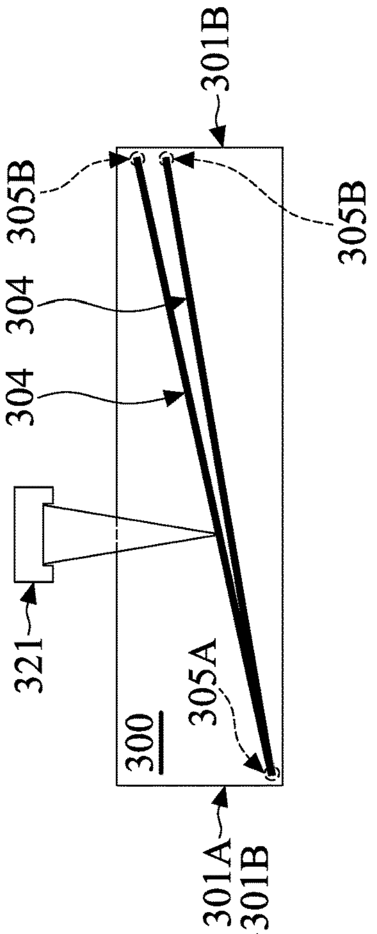
FIGS. 11 and 12 illustrate the formation of a waveguide structure, in accordance with some embodiments.
Figure 11:
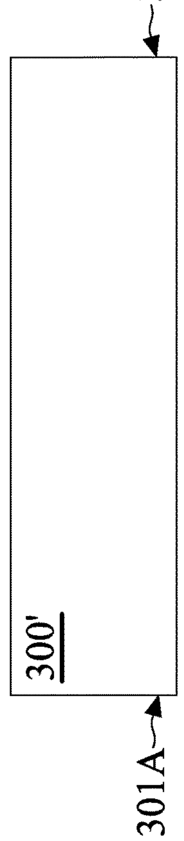

FIGS. 11 and 12 illustrate cross-sectional views of intermediate steps in the formation of a waveguide structure 300, in accordance with some embodiments. The waveguide structure 300 is a structure that provides optical coupling between waveguides (e.g., waveguides 104 of an optical engine 100) and an external optical component (e.g., the optical fiber connector 522 of FIG. 25 or the like), in accordance with some embodiments. The waveguide structure 300 may be used, for example, to provide optical coupling within a photonic system, such as the photonic system 500 described below for FIG. 25, or the like. FIGS. 13, 14, 15, 16, 17, 18, and 19 illustrate various views of embodiment waveguide structures 300 similar to that shown in FIG. 12. The waveguide structures 300 shown in FIGS. 13-19 are intended as non-limiting examples, and waveguide structures 300 (and waveguides 304 therein) having other configurations or arrangements are possible in other embodiments.

FIG. 11 illustrates a cross-sectional view of a transparent block 300', in accordance with some embodiments. One or more waveguides 304 are subsequently formed in the transparent block 300' using a laser-writing process or the like, described in greater detail below for FIG. 12. Accordingly, the material of the transparent block 300' may comprise a material that is suitable for a laser-writing, such as a borosilicate glass, a soda-lime-silica glass, a fluoride glass (e.g., fluorozirconate glass or the like), another type of glass, a high-silica (e.g. silicon oxide-based) material, a polymer, or the like. The material of the transparent block 300' may be transparent to appropriate laser wavelengths. The transparent block 300' may be considered a "waveguide substrate" or a "glass block" in some cases. In some embodiments, the transparent block 300' may be formed using suitable techniques that form the transparent block 300' as a single piece, such as glass molding techniques or the like. Forming a transparent block 300' using a glass molding process or the like can allow for design flexibility, improve structural stability, reduce cost, and/or reduce the size of a photonic system. The transparent block 300' may be formed using other techniques in other embodiments.

With reference to FIG. 11, the transparent block 300' has a first side 301A and a second side 301B opposite the first side 301A. The sides 301A-B of the transparent block 300' may be flat, concave, convex, irregular, stepped, or curved. In some embodiments, the transparent block 300' has a length (e.g., a distance between opposite ends 303A-B) in the range of about 15 mm to about 20 mm, though other lengths are possible. In some embodiments, the transparent block 300' has a thickness in the range of about 1 mm to about 2.5 mm, though other thicknesses are possible. In some embodiments, the transparent block 300' has a flat top surface and a flat bottom surface, though other surface profiles are possible. In some cases, the dimensions of the transparent block 300' may be determined according to the specification, application, or configuration of the photonic system in which it is used.

FIG. 12 illustrates a cross-sectional view of the formation of waveguides 304 in the transparent block 300' to form a waveguide structure 300, in accordance with some embodiments. The waveguides 304 may be formed, for example, using a laser writing process or the like, represented in FIG. 12 by laser writing device 321. A laser writing process focuses a laser on a localized region within the transparent block 300', changing the material properties of that localized region. For example, the laser may increase the refractive index of the localized region relative to adjacent (e.g., not laser-written) regions of the transparent block 300'. By performing the laser writing process along a path within the transparent block 300', continuous laser-written portions of the transparent block 300' may be formed that act as a waveguide (e.g., a waveguide 304). The laser writing process may be performed multiple times to form single or multiple waveguides 304 within the transparent block 300'. The laser writing process used to form the waveguides 304 may be a Femtosecond Direct Laser Writing process or the like, in some embodiments. In some embodiments, the size, shape, location, optical properties, or other properties of a waveguide 304 may depend on the material(s) of the transparent block 300' or may be controlled by controlling parameters such as laser wavelength, laser pulse energy, focal spot size, laser intensity profile or phase profile, laser pulse width (e.g., duration), laser pulse repetition rate or duty cycle, laser writing path speed, laser writing direction, laser polarization, or other parameters.

As shown in FIG. 12, the waveguides 304 formed by the laser writing process may extend from the first side 301A of the waveguide structure 300 to the second side 301B of the waveguide structure 300. In other words, each waveguide 304 may have a respective first end 305A at or near the first side 301A and a respective second end 305B at or near the second side 301B. The ends 305A-B may be flush (e.g., coterminous) with the respective sides 301A-B or may be offset from the respective sides 301A-B.

In some embodiments, the first end 305A of each waveguide 304 is a different height above the bottom surface than its second end 305B. For example, as shown in FIG. 12, the first ends 305A of the waveguides 304 are closer to the bottom surface of the waveguide structure 300 than the respective second ends 305B. In this manner, forming the waveguides 304 using a laser writing process can allow for flexible configurations or arrangements of waveguides 304 to facilitate appropriate optical coupling. Additionally, as shown in FIG. 12 and in other figures, the waveguides 304 may be formed having various combinations of heights, positions, or arrangements within the waveguide structure 300.

Figure 13:
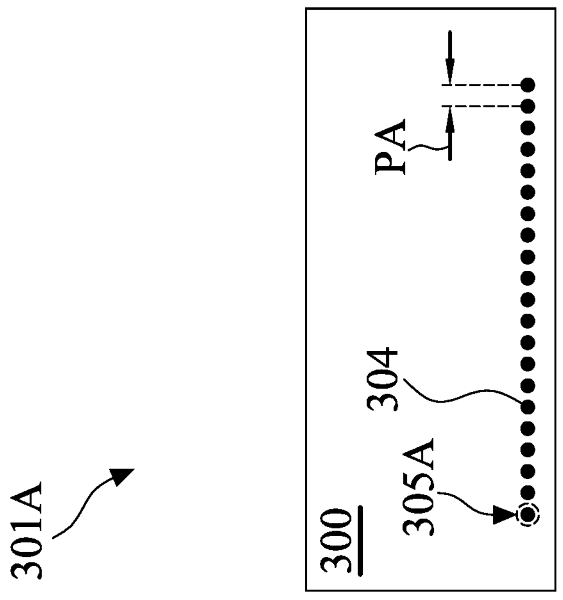
FIGS. 13, 14, 15, 16, 17, 18, and 19 illustrate various views of waveguide structures, in accordance with some embodiments.
Figure 14:
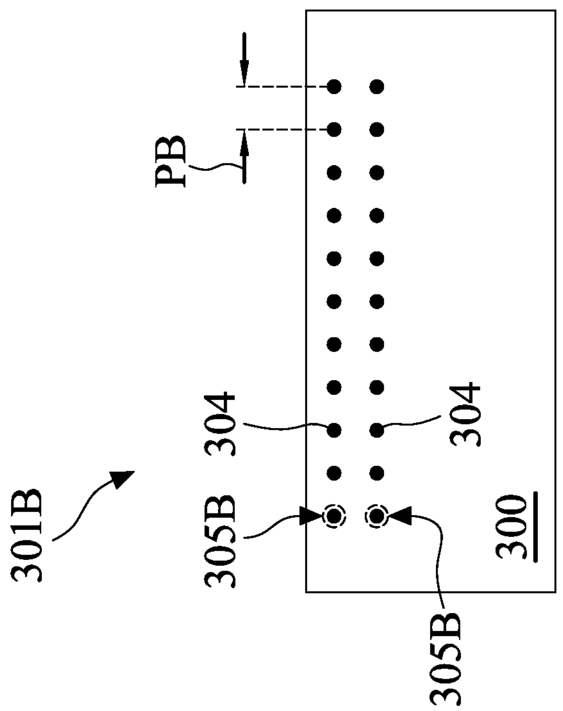
Figure 15:
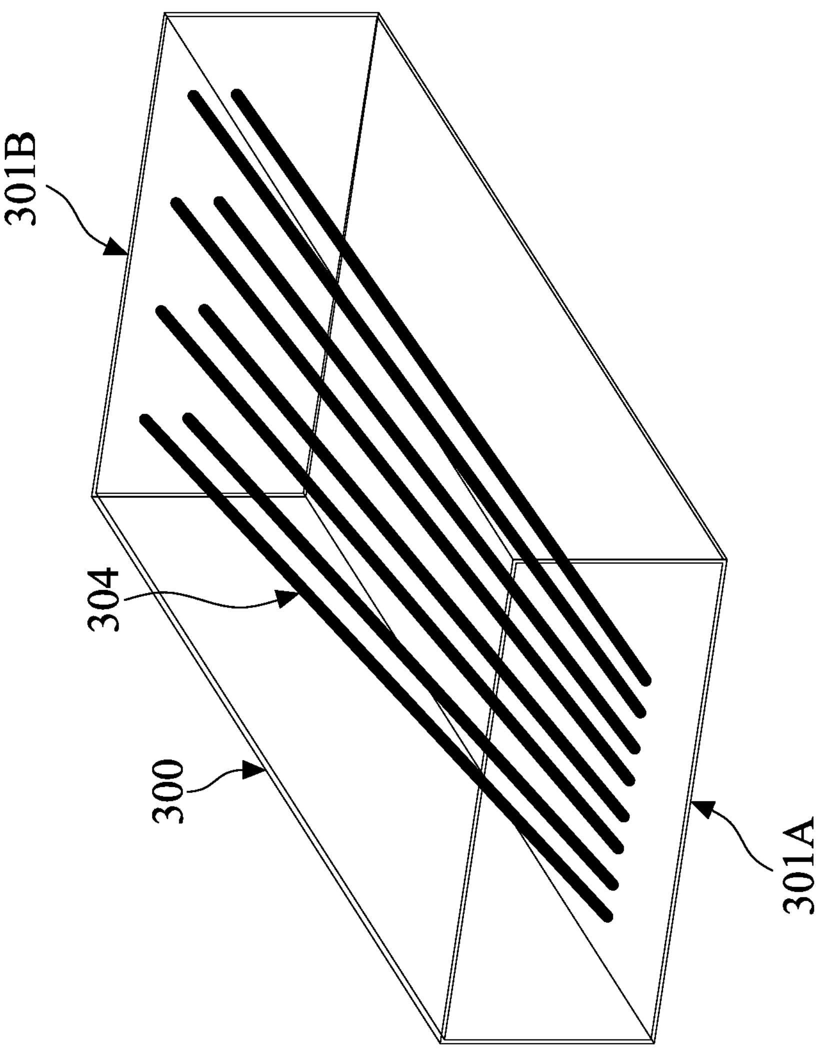

FIG. 13 illustrates a view of a waveguide structure 300 towards the first side 301A, and FIG. 14 illustrates a view of a waveguide structure 300 towards the second side 301B, in accordance with some embodiments. As shown in FIGS. 13-14, the first ends 305A of the waveguides 304 have a different height than the second ends 305B. The first ends 305A and/or the second ends 305B may have different arrangements. For example, FIG. 13 shows the first ends 305A arranged in a single row and FIG. 14 shows the second ends 305B arranged in two rows of different heights. FIG. 15 illustrates a three-dimensional view of a waveguide structure 300 similar to those of FIGS. 12-14, in which the waveguides 304 are in a single row near the first side 301A and in multiple rows near the second side 301B. Other combinations of waveguides 304 arranged in rows are possible.

Returning to FIGS. 13-14, in some embodiments, the first ends 305A may have a first pitch PA and the second ends 305B may have a second pitch PB that is different from the first pitch PA. For example, in some embodiments, the first pitch PA may be in the range of about 10 μm to about 125 μm and the second pitch PB may be in the range of about 250 μm to about 500 μm, though other pitches are possible. The first ends 305A may have the same diameter or a different diameter than the second ends 305B. In other words, the diameter of a waveguide 304 may be approximately constant along its length or may change along its length. In some embodiments, a diameter of a waveguide 304 may be in the range of about 3 μm to about 10 μm, though other diameters are possible. In some embodiments, the configuration (e.g., pitch, height, diameter, etc.) of the first ends 305A may correspond to a configuration of edge couplers 107 and the configuration of the second ends 305B may correspond to an optical fiber component such that the waveguides 304 may be optically coupled to the edge couplers 107 and the optical fiber component. In this manner, a waveguide structure 300 may provide optical coupling between optical features with different configurations (e.g., different sizes, pitches, heights, etc.) within a compact footprint, which can allow for more efficient photonic systems of smaller size. In other embodiments, a waveguide structure 300 may have another number of waveguides 304, and the ends 305A-B may have other pitches, other heights, other numbers of rows, other diameters, or any other suitable arrangement. In some embodiments, the second side 301B may optionally include one or more openings (not shown) that are configured to receive alignment pins of an optical fiber connector or the like.

Figure 16:
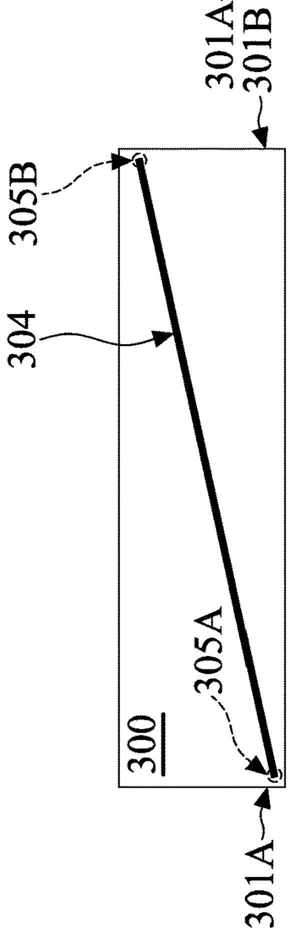

FIG. 16 illustrates a cross-sectional view of a waveguide structure 300, in accordance with some embodiments. The waveguide structure 300 of FIG. 16 is similar to that shown in FIG. 12, except that the ends 305A are a first height and the ends 305B are a second height. In other words, the ends 305A-B of the waveguide(s) 304 of FIG. 16 are arranged in a single row at each side 301A-B. In other embodiments, the ends 305A-B may be arranged at two rows at each side 301A-B or other numbers of rows at each side 301A-B.

Figure 17:
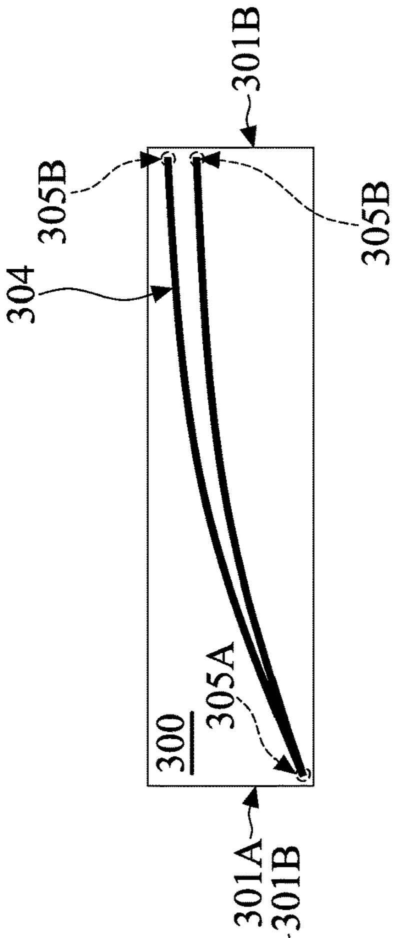

FIG. 17 illustrates a cross-sectional view of a waveguide structure 300, in accordance with some embodiments. The waveguide structure 300 of FIG. 17 is similar to that shown in FIG. 12, except that the waveguides 304 are curved rather than linear (e.g., straight). For example, the waveguides 304 of FIG. 17 have vertical curvature between the first ends 305A and the second ends 305B. Waveguides 304 may have a different curvature than shown in FIG. 17. For example, in other embodiments, the waveguides 304 may be "S-shaped" or the like such that the ends 305A-B are approximately parallel to the bottom surface (e.g., perpendicular to the sides 301A-B). The waveguides 304 may follow other curved paths than these examples in other embodiments. In some cases, forming waveguides 304 with curvature may allow for improved coupling between the ends 305A-B and other optical features. In some cases, forming waveguides 304 with curvature may allow for a denser arrangement of waveguides 304 and may allow for more possible arrangements of waveguides 304.

Figure 19:
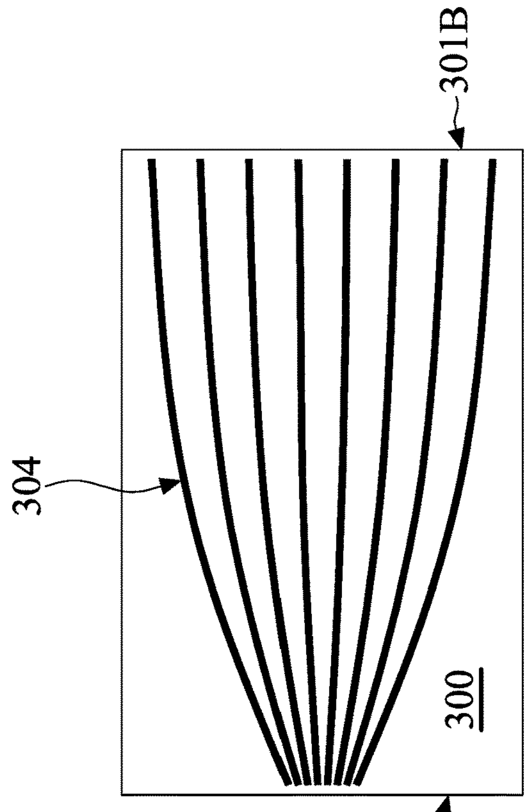
Figure 18:
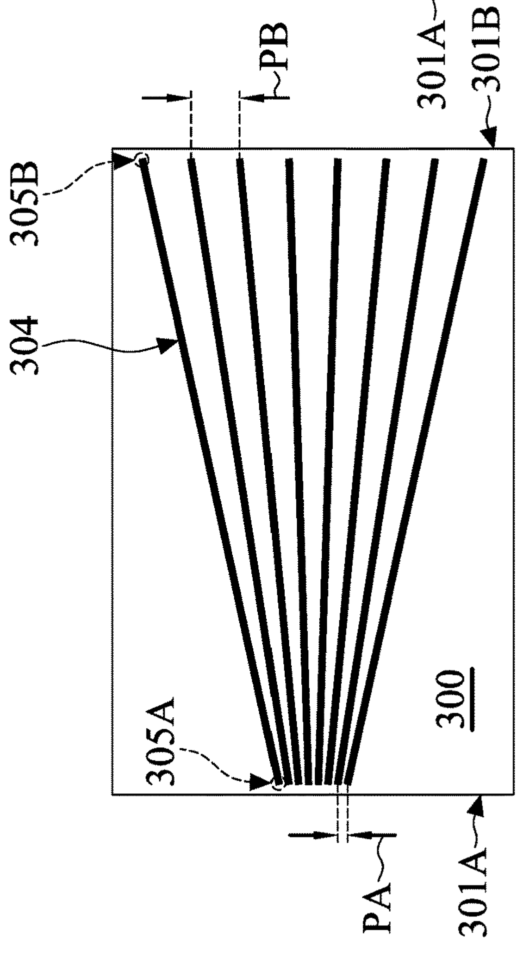

FIGS. 18 and 19 illustrate plan views of waveguide structures 300, in accordance with some embodiments. The waveguide structures 300 of FIGS. 18-19 may be similar to the waveguide structure 300 shown in FIG. 12. As shown in FIGS. 18-19, the first ends 305A have a first pitch PA that is smaller than the second pitch PB of the second ends 305B, and the waveguides 304 have been formed to spread laterally (e.g., horizontally or transversely) from the first side 301A towards the second side 301B. In this manner, the waveguide structure 300 may be considered a "fan-in" structure or a "fan-out" structure for optical coupling, and allow for optical coupling between optical features of different pitches or different arrangements. The waveguides 304 may be substantially straight (e.g., linear), as shown in the plan view of FIG. 18, or may be laterally curved, as shown in the plan view of FIG. 19. In some embodiments, a waveguide structure 300 may include both straight and curved waveguides 304.

Figure 20:
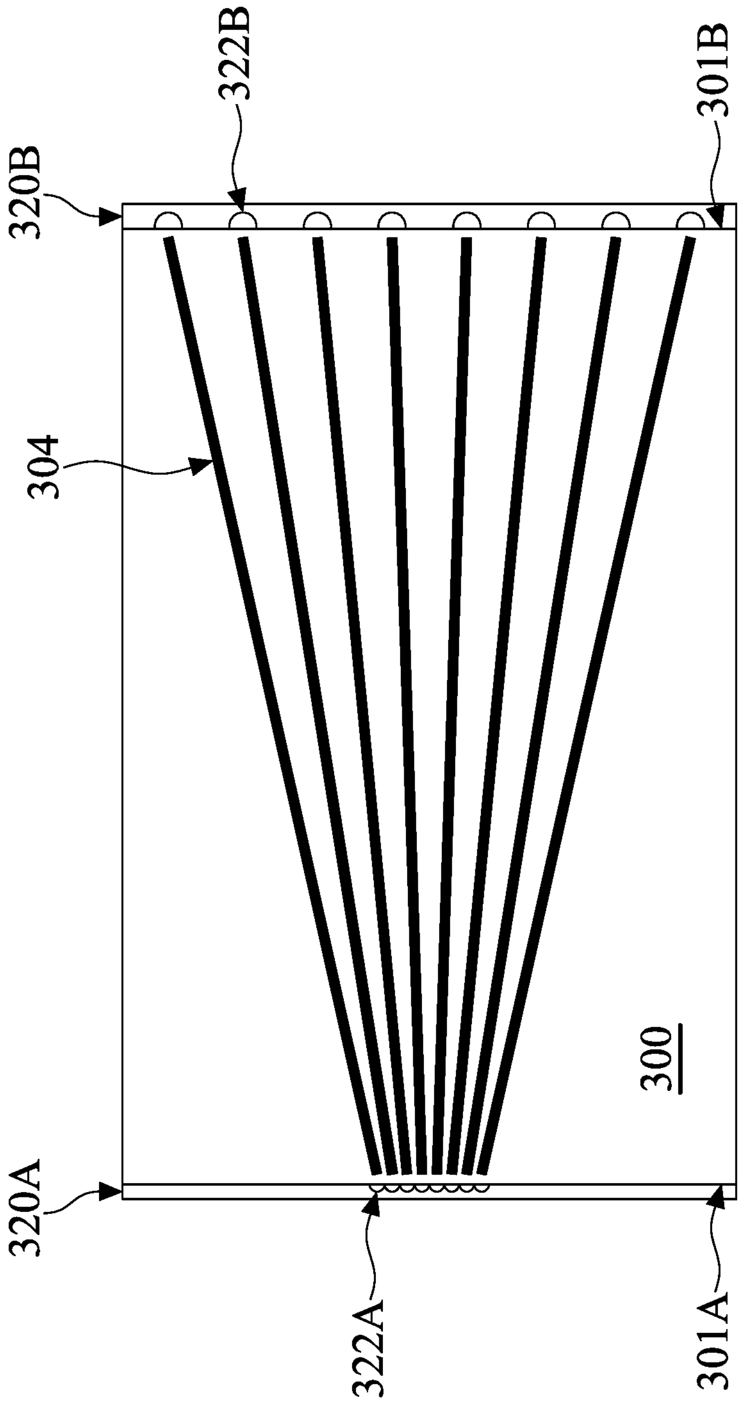
FIGS. 20, 21, 22, and 23 illustrate various views of waveguide structures with attached lenses, in accordance with some embodiments.

FIG. 20 illustrates a waveguide structure 300 with optional lens attachments 320A and 320B, in accordance with some embodiments. The waveguide structure 300 may be similar to the waveguide structures 300 described previously. A first lens attachment 320A comprising one or more lenses 322A may be attached to the first side 301A of the waveguide structure 300, and a second lens attachment 320B comprising one or more lenses 322B may be attached to the second side 301B of the waveguide structure 300. In other embodiments, only one of the lens attachments 320A-B is attached to the waveguide structure 300. The lens attachments 320A-B may be attached, for example, using an adhesive (e.g., an optical glue), dielectric-to-dielectric bonding, a fastener, or using any other suitable technique.

The lenses 322A-B of the lens attachments 320A-B may be refractive lenses, and may be convex, circular, spherical, elliptical, ellipsoidal, annular, rectangular, cylindrical, or have another suitable shape. The lenses 322A of the first lens attachment 320A may be similar to or different than the lenses 322B of the second lens attachment 320B. In some embodiments, each lens 322A-B is located near a corresponding waveguide 304. For example, each lens 322A may be located near a corresponding first end 305A and each lens 322B may be located near a corresponding second end 305B. The lenses 322A-B may allow for improved optical coupling between the waveguides 304 and other optical features. For example, in some embodiments, the lenses 322A of the first lens attachment 320A may improve optical coupling between the waveguides 304 and respective edge couplers 107 of an optical engine 100, and the lenses 322B of the second lens attachment 320B may improve optical coupling between the waveguides 304 and an optical fiber connector 522 (see FIG. 25). In some cases, the use of the lens attachments 320A-B may improve misalignment tolerance during alignment of the waveguide structure 300 to an optical feature to which it is optically coupled. In some cases, the use of the lens attachments 320A-B may obviate the need for active alignment of the waveguide structure 300.

Figure 22:
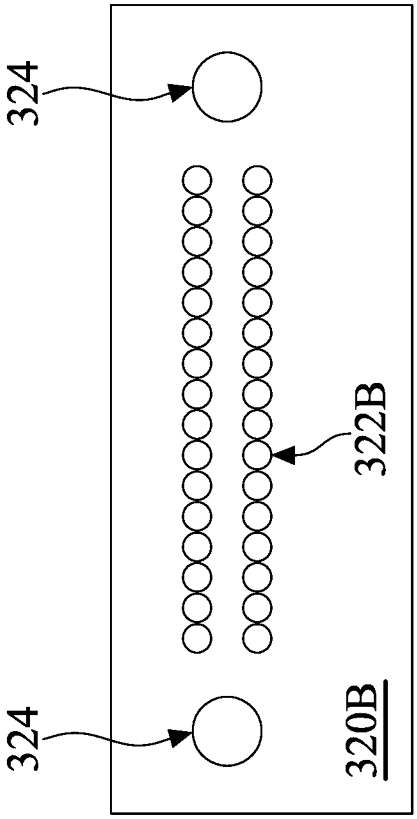
Figure 21:
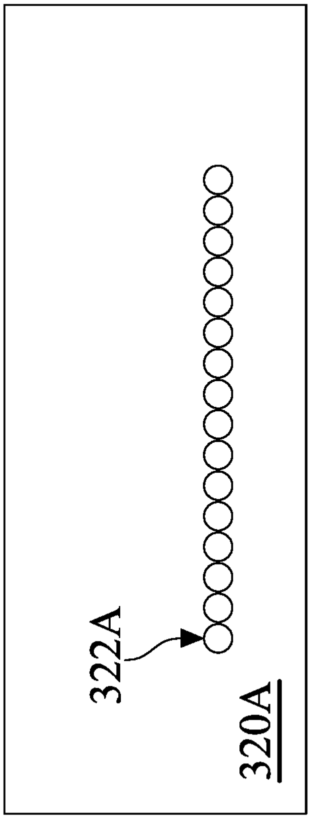
Figure 23:
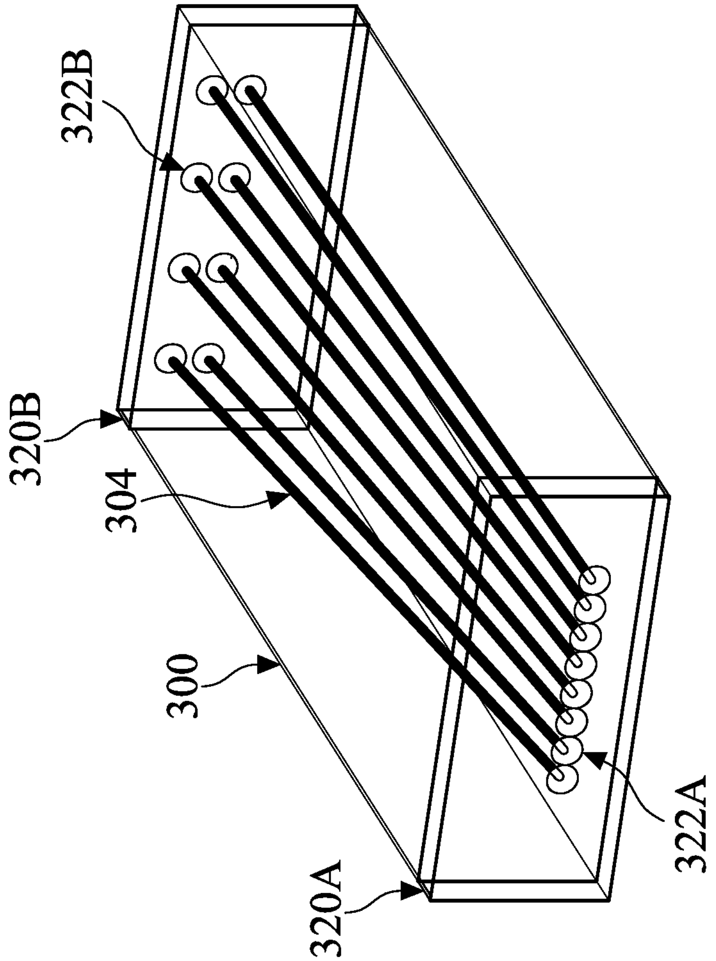

FIG. 21 illustrates a view of a first lens attachment 320A, and FIG. 22 illustrates a view of a second lens attachment 320B, in accordance with some embodiments. The view of FIG. 21 may be similar to the view of FIG. 13, and the view of FIG. 22 may be similar to the view of FIG. 14, in some cases. As shown in FIGS. 21-22, the first lens attachment 320A may include one or more rows of lenses 322A and the second lens attachment 320B may include one or more rows of lenses 322B. In some embodiments, the second lens attachment 320B may include one or more optional openings 324 that are configured to receive alignment pins of an optical fiber connector or the like. FIG. 23 illustrates a three-dimensional view of a waveguide structure 300 with lens attachments 320A-B, in accordance with some embodiments. The waveguide structure 300 and the three-dimensional view of FIG. 23 is similar to those of FIG. 15, in which the waveguides 304 are in a single row near the first side 301A and in multiple rows near the second side 301B. Other arrangements of lenses 322A-B or waveguides 304 are possible.

Figure 24:
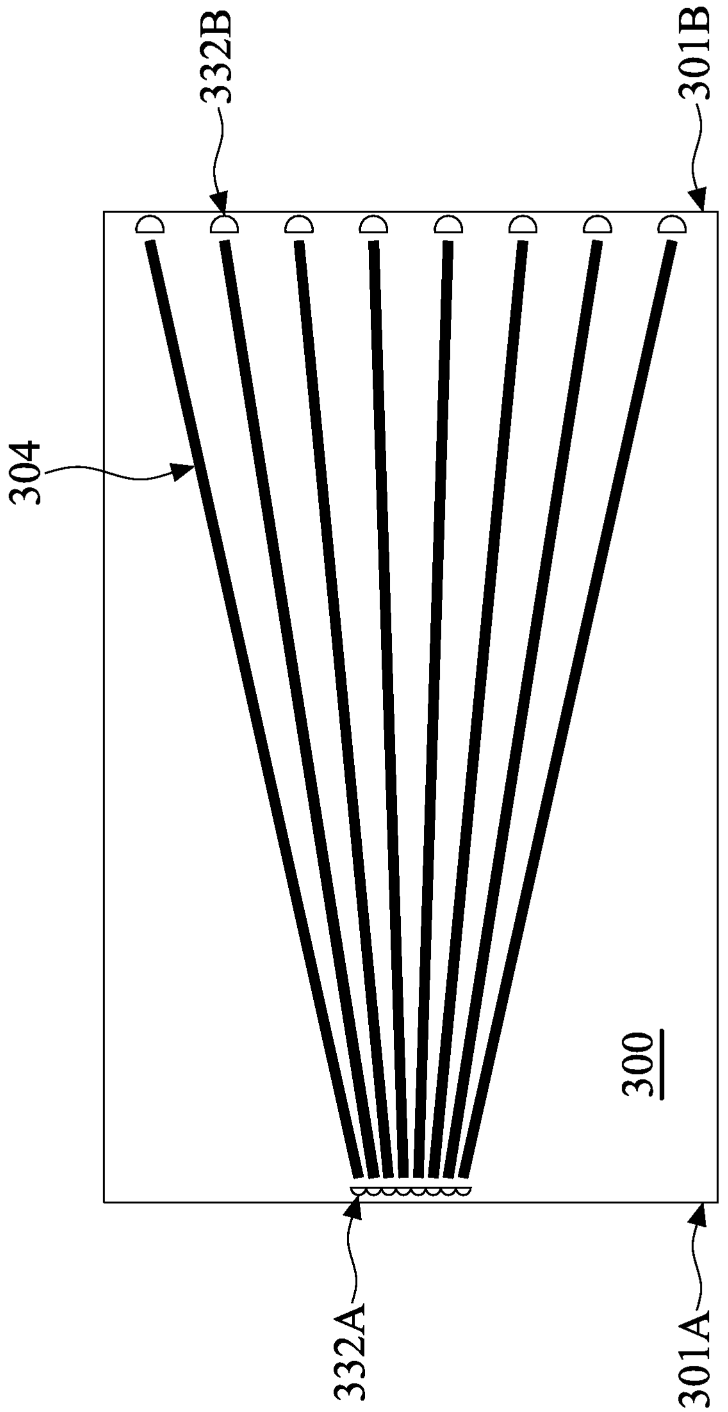
FIG. 24 illustrates a waveguide structure with inscribed lenses, in accordance with some embodiments.

FIG. 24 illustrates a waveguide structure 300 with optional laser-written lenses 332A-B, in accordance with some embodiments. The waveguide structure 300 may be similar to the waveguide structures 300 described previously. The lenses 332A-B may be, for example, diffractive optical structures or the like formed within the transparent block 300' using a laser writing process. In some cases, the laser written lenses 322A-B may be considered "inscribed lenses." The lenses 332A-B may be formed using the same (or similar) laser writing process as the laser writing process that forms the waveguides 304, in some embodiments. The lenses 332A-B may be formed at or near the first ends 305A of the waveguides 304, and the lenses 332B may be formed at or near the second ends 305B of the waveguides 304. In other embodiments, lenses 332A-B are formed only at one end of the waveguides 304. The lenses 322A-B may be contiguous with the waveguides 304 or may be separated from the waveguides 304, as shown in FIG. 24. The lenses 332A-B of a waveguide structure 300 may be similar or different from the lenses 332B of the same waveguide structure 300. In some embodiments, both lens attachments 320A-B and lenses 332A-B may be utilized. In such embodiments, a lens attachment 320 and lenses 332A-B may be present at the same side of the waveguide structure 300 or on opposite sides of the waveguide structure 300. Other combinations of lens attachments 320 and lenses 332A-B are possible. The lenses 332A-B can provide improved optical coupling of the waveguides 304 to other optical features (e.g., edge couplers 107 or other optical components) and can allow for larger misalignment tolerance.

Figure 25:
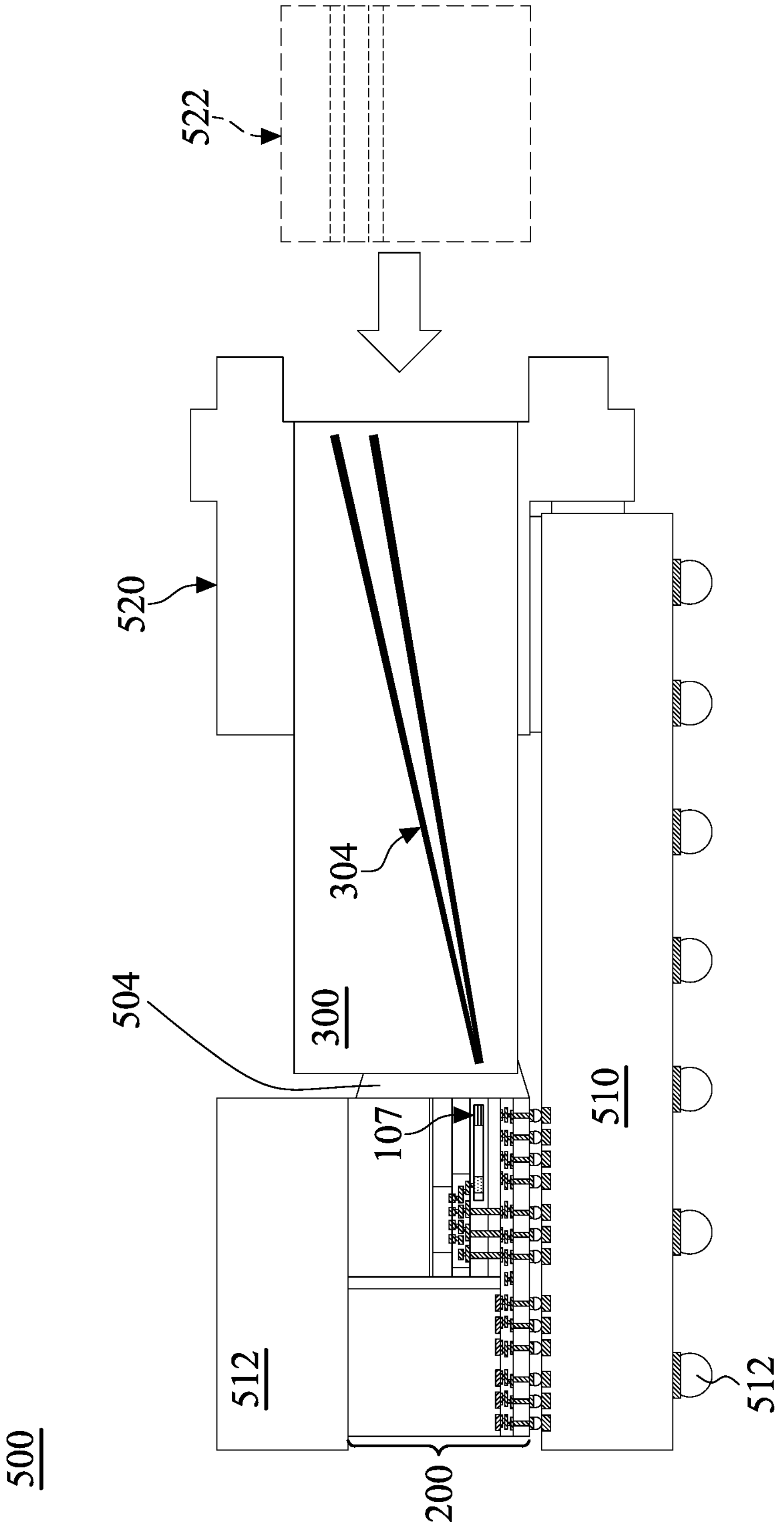
FIG. 25 illustrates a photonic system, in accordance with some embodiments.

FIG. 25 illustrates a photonic system 500, in accordance with some embodiments. The photonic system 500 comprises a photonic package 200 that is optically coupled to a waveguide structure 300, which may be similar to the waveguide structures 300 described above. The waveguide structure 300 may be configured to optically couple an optical fiber component 522 to the photonic package 200. For example, an optical fiber component 522 may be optically coupled to edge couplers 107 of an optical engine 100 by waveguides 304 of the waveguide structure 300, in some embodiments. In some embodiments, the photonic system 500 comprises an optional lid 512. The various features of the various embodiments of photonic systems, optical engines, photonic packages, or waveguide structures described herein may be combined or reconfigured in other ways than shown in FIG. 25. In other embodiments, a photonic system 500 comprises multiple optical engines, photonic packages, or waveguide structures. All such variations are considered within the scope of the present disclosure.

In some embodiments, a photonic package 200 is connected to a package substrate 510. The photonic package 200 may be similar to the photonic package 200 described previously for FIG. 10. For example, the photonic package 200 may include an optical engine 100 comprising one or more edge couplers 107. Multiple photonic packages 200 may be attached to the package substrate 510 in other embodiments. In some embodiments, the package substrate 510 comprises conductive pads, conductive routing, and/or other conductive features such as through substrate vias (TSVs). In some embodiments, the package substrate 510 may comprise an interposer, a semiconductor substrate, a redistribution structure, a core substrate, a printed circuit board (PCB), or a different type of structure than these examples. In some embodiments, the package substrate 510 comprises active and/or passive devices. In other embodiments, the package substrate 510 is free of active and/or passive devices. In some embodiments, conductive connectors 512 are formed on the package substrate 510. The conductive connectors 512 may be similar to the conductive connectors 218 described previously for FIG. 10, and may be formed using similar materials or techniques. For example, the conductive connectors 512 may comprise solder bumps or the like.

In some embodiments, the conductive connectors 218 of the photonic package 200 are placed on corresponding conductive pads of the package substrate 510 and then performing a reflow process to bond the photonic package 200 to the package substrate 510. In this manner, the photonic package 200 may be electrically connected to the package substrate 510. In other embodiments, the photonic package 200 may be bonded to the package substrate 510 using dielectric-to-dielectric bonding and/or metal-to-metal bonding (e.g., direct bonding, fusion bonding, oxide-to-oxide bonding, hybrid bonding, or the like).

In some embodiments, the photonic system 500 comprises a holder 520 (or adapter) that supports or secures the waveguide structure 300. For example, the holder 520 may comprise an opening within which the waveguide structure 300 is placed. The waveguide structure 300 may be attached to the holder 520 using an adhesive, in some embodiments. The holder 520 may be attached to the package substrate 510, for example, using an adhesive. The holder 520 may also be configured to receive an optical fiber connector 522, in some embodiments. The holder 520 may secure the optical fiber connector 522 and facilitate optical alignment of the optical fiber connector 522 to the waveguides 304 of the waveguide structure 300. For example, in some embodiments, the optical fiber connector 522 may be optically coupled to second ends 305B (see FIGS. 12-19) of the waveguides 304. In some cases, lenses 322B may improve optical coupling and misalignment tolerance between the waveguides 304 and the optical fiber connector 522. The holder 520 shown in FIG. 25 is a representative example, and other holders 520 having other shapes, sizes, or configurations are possible.

In some embodiments, the optical fiber connector 522 may be an optical component such as an optical fiber, an MT ferrule, a fiber array (e.g., a fiber array unit), an MPO connector, an MTP connector, a fiber cable, or the like. Other types of optical fiber connectors 522 are possible. In some embodiments, the optical fiber connector 522 includes alignment pins (not shown) that are inserted into corresponding openings or pinholes (not shown) in the waveguide structure 300 and/or the holder 520. In some embodiments, the second lens attachment 320B may also have openings configured to receive alignment pins, such as openings 324 shown in FIG. 22.

As stated above, the waveguides 304 of the waveguide structures 300 may be optically coupled to the photonic package 200. For example, in some embodiments, edge couplers 107 of an optical engine 100 may be optically coupled to first ends 305A (see FIGS. 12-19) of the waveguides 304. In this manner, the waveguides 304 may optically couple the waveguide(s) 104 of the optical engine 100 to an optical component (e.g., an optical fiber connector 522) such that optical signals and/or optical power may be transmitted between the optical engine 100 and the optical component. The waveguide structure 300 described herein can allow for efficient optical coupling between an optical engine 100 and an optical component over a relatively small distance.

In some embodiments, the waveguide structure 300 may be actively aligned to the optical engine 100 or passively aligned to the optical engine 100. In active alignment, an electrical signal corresponding to alignment is generated by the optical engine 100 and is monitored during the alignment process to facilitate efficient alignment between the waveguides 304 and the edge couplers 107. In passive alignment, the waveguide structure 300 is aligned without monitoring an electrical signal. In some cases, the use of lenses (e.g. lenses 322 or 332) may allow for improved passive alignment. In some embodiments, after alignment, an optical adhesive 504 may be deposited between the photonic package 200 and the waveguide structure 300 to protect surfaces, provide structural support, and facilitate optical coupling between the photonic package 200 and the waveguide structure 300. For example, the optical adhesive 504 may be deposited into a gap between the photonic package 200 and the waveguide structure 300. The optical adhesive 504 may be any suitable optical adhesive, optical glue, or the like.

Figure 26:
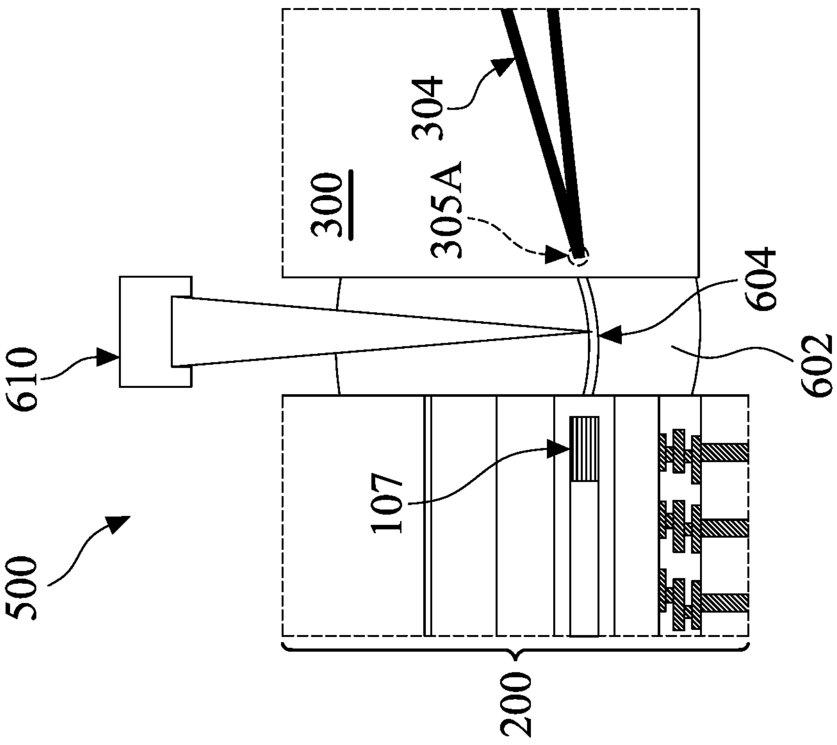
FIGS. 26 and 27 illustrate the formation of polymer waveguides, in accordance with some embodiments.
Figure 27:
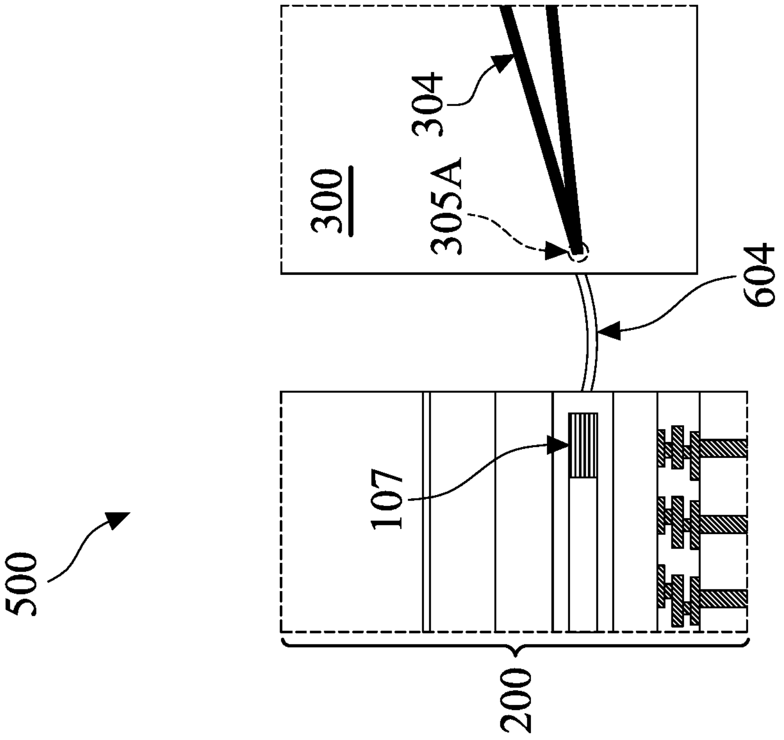

FIGS. 26 and 27 show intermediate steps in the formation of polymer waveguides 604, in accordance with some embodiments. FIGS. 26 and 27 illustrate a magnified cross-sectional portion of a photonic package 200, a waveguide structure 300, and the gap therebetween. In some embodiments, the polymer waveguides 604 may be formed instead of depositing an optical adhesive 504. In some embodiments, the polymer waveguides 604 may be formed to optically couple waveguides 304 to edge couplers 107, and thus may obviate the need for alignment of the waveguides 304 to the edge couplers 107.

In FIG. 26, a polymer material 602 is deposited between the photonic package 200 and the waveguide structure 300. The polymer material 602 may be any photosensitive resins suitable for forming laser-written waveguides, such as inorganic-organic hybrid materials, urethane acrylate monomers, acrylic-based prepolymers, epoxy-acrylate resin, or the like, or a combination thereof. The waveguides 604 may be formed, for example, using a laser writing process or the like, represented in FIG. 26 by laser writing device 610. The laser writing process may focus a laser on a localized region within the polymer material 602, changing the material properties of that localized region through polymerization initiated by nonlinear absorption. For example, the laser may increase the refractive index of the localized region or solidify the localized region. By performing the laser writing process along a path within the polymer material 602, continuous laser-written portions of the polymer material 602 may be formed that act as a waveguide (e.g., a waveguide 604). The laser writing process may be performed multiple times to form multiple waveguides 604 within the polymer material 602. The laser writing process used to form the waveguides 604 may be similar to the laser writing process 321 described previously, in some cases. In some embodiments, the size, shape, location, optical properties, or other properties of a waveguide 604 may depend on the material(s) of polymer material 602 or may be controlled by controlling parameters such as laser wavelength, laser pulse energy, focal spot size, laser intensity profile or phase profile, laser pulse width (e.g., duration), laser pulse repetition rate or duty cycle, laser writing path speed, laser writing direction, laser polarization, or other parameters.

As shown in FIG. 26, each waveguide 604 formed by the laser writing process may extend from a sidewall of the waveguide structure 300 near a first end 305A of a respective waveguide 304 to a sidewall of the optical engine 100 near a corresponding edge coupler 107. The waveguide 604 may be optically coupled to the waveguide 304 and to the edge coupler 107. In this manner, a waveguide 604 may be formed that optically couples a waveguide 304 to a corresponding edge coupler 107. In some embodiments, the laser writing process may be performed multiple times to form a waveguide 604 between each edge coupler 107 and a corresponding waveguide 304.

In FIG. 27, a cleaning process is performed that selectively removes the polymer material 602 and leaves the waveguides 604. The cleaning process may comprise a wet chemical clean, a wet etching process, a dry etching process, an ashing process, or the like. In this manner, the waveguides 604 may be formed as free-standing structures, which can improve the optical confinement of the waveguides 604 and reduce optical loss.

The embodiments of the present disclosure have some advantageous features. By forming waveguide structures that include laser written waveguides therein, optical components (e.g., optical fibers) may be integrated with optical engines. The waveguide structures allow transmission of optical power and/or optical signals between optical features of the optical engines (e.g., edge couplers) and optical components, in which the optical features and the optical components may have different sizes, pitches or heights. In this manner, the waveguide structure described herein may act as a fiber array unit (FAU). The use of laser writing to form waveguides can allow the waveguide structure to be customized for a variety of applications or configurations. Additionally, the use of a waveguide structure as described herein can allow for efficient optical coupling over a smaller distance or more compact volume, which can reduce package size.

In an embodiment of the present disclosure, a package includes an optical engine attached to a package substrate, wherein the optical engine includes a first waveguide; and a waveguide structure attached to the package substrate adjacent the optical engine, wherein the waveguide structure includes a second waveguide within a transparent block, wherein a first end of the second waveguide is optically coupled to the first waveguide, wherein the waveguide structure is configured to be connected to an optical fiber component such that a second end of the second waveguide is optically coupled to an optical fiber of the optical fiber component. In an embodiment, the optical fiber component includes an MT ferrule. In an embodiment, the package includes an optical adhesive extending from a sidewall of the optical engine to a sidewall of the waveguide structure. In an embodiment, the transparent block and the second waveguide are the same material. In an embodiment, the transparent block includes lenses within the transparent block, wherein the lenses are adjacent respective ends of the second waveguide. In an embodiment, the second waveguide is a laser-written waveguide. In an embodiment, the transparent block has a length in the range of 15 mm to 20 mm. In an embodiment, the second waveguide is optically coupled to the first waveguide by an edge coupler within the optical engine. In an embodiment, the package includes a holder, wherein the transparent block is secured by the holder, wherein the holder is configured to attach to the optical fiber component, wherein the second waveguide is optically coupled to the optical fiber when the optical fiber component is attached to the holder.

In an embodiment of the present disclosure, a device includes a photonic package that includes edge couplers; a glass block adjacent the photonic package, wherein the glass block includes waveguides, wherein each waveguide has a first end and a second end, wherein the first end of each waveguide is optically coupled to a respective edge coupler, wherein the first end of each waveguide is closer to a bottom surface of the glass block than the respective second end of that waveguide; and a holder surrounding the glass block, wherein the holder is configured to connect to an optical fiber. In an embodiment, the first ends of the waveguides are arranged in a horizontal row. In an embodiment, the first ends of the waveguides have a first pitch and the second ends of the plurality of waveguides have a second pitch that is greater than the first pitch. In an embodiment, the first pitch is in the range of 10 μm to 125 μm and the second pitch is in the range of 250 μm to 500 μm. In an embodiment, the device includes a lens attachment on a sidewall of the glass block, wherein the lens attachment includes lenses, wherein each lens is optically coupled to a respective waveguide of the waveguides. In an embodiment, the first ends of the waveguides are arranged in a horizontal row. In an embodiment, the second ends of the waveguides are arranged in a first horizontal row that is a first height above a bottom surface of the glass block and a second horizontal row that is a second height above the bottom surface of the glass block that is different than the first height.

In an embodiment of the present disclosure, a method includes forming a transparent block; performing a laser writing process to form a waveguide within the transparent block; aligning the waveguide to the edge coupler of a photonic package; and attaching an optical fiber to the transparent block, wherein the attached optical fiber is optically coupled to the waveguide. In an embodiment, the method includes depositing a polymer material between the transparent block and the photonic package; and performing a laser writing process on the polymer material to form a polymer waveguide extending from the transparent block to the photonic package, wherein the polymer waveguide optically couples the waveguide to an edge coupler of the photonic package. In an embodiment, a first end of the waveguide has a first diameter and a second end of the waveguide has a second diameter that is different from the first diameter. In an embodiment, the waveguide follows a curved path.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device comprising:

a photonic package on a substrate, wherein the photonic package comprises a plurality of edge couplers;

a glass block adjacent the photonic package, wherein the glass block comprises a plurality of waveguides, wherein each waveguide has a first end and a second end, wherein the first end of each waveguide is optically coupled to a respective edge coupler, wherein the first end of each waveguide is closer to a bottom surface of the glass block than the respective second end of that waveguide;

an optical adhesive extending from a sidewall of the photonic package to a sidewall of the glass block; and a holder surrounding the glass block, wherein the holder is configured to connect to an optical fiber, wherein the holder is attached to the substrate.

2. The device of claim 1, wherein the second ends of the plurality of waveguides are arranged in a plurality of horizontal rows.

3. The device of claim 1, wherein the first ends of the plurality of waveguides have a first pitch and the second ends of the plurality of waveguides have a second pitch that is greater than the first pitch.

4. The device of claim 3, wherein the first pitch is in the range of 10 μm to 125 μm and the second pitch is in the range of 250 μm to 500 μm.

5. The device of claim 1 further comprising a lens attachment on a sidewall of the glass block, wherein the lens attachment comprises a plurality of lenses, wherein each lens of the plurality of lenses is optically coupled to a respective waveguide of the plurality of waveguides.

6. The device of claim 1, wherein the second ends of the plurality of waveguides are arranged in a first horizontal row that is a first height above a bottom surface of the glass block and a second horizontal row that is a second height above a bottom surface of the glass block that is different than the first height.

7. The device of claim 1, wherein the substrate is free of the optical adhesive.

8. The device of claim 1, further comprising a polymer waveguide extending from the sidewall of the photonic package to the sidewall of the glass block, wherein the first end of a waveguide is optically coupled to a respective edge coupler by the polymer waveguide.

* * * * *